(12) United States Patent
Kay et al.

(10) Patent No.: US 9,827,728 B2
(45) Date of Patent: Nov. 28, 2017

(54) DEVICES AND METHODS FOR THE PRODUCTION OF MICROFIBERS AND NANOFIBERS IN A CONTROLLED ENVIRONMENT

(71) Applicant: CLARCOR Inc., Franklin, TN (US)

(72) Inventors: Stephen Kay, Austin, TX (US); Yogesh Ner, McAllen, TX (US); Lenard Castellano, Huntington, NY (US)

(73) Assignee: CLARCOR Inc., Franklin, TN (US)

( * ) Notice: Subject to any disclaimer, the term of this patent is extended or adjusted under 35 U.S.C. 154(b) by 598 days.

(21) Appl. No.: 13/960,383

(22) Filed: Aug. 6, 2013

(65) Prior Publication Data

US 2014/0159262 A1 Jun. 12, 2014

Related U.S. Application Data

(60) Provisional application No. 61/680,109, filed on Aug. 6, 2012, provisional application No. 61/776,054, filed on Mar. 11, 2013.

(51) Int. Cl.

| | |
|---|---|
| *D01D 5/18* | (2006.01) |
| *B29C 47/00* | (2006.01) |
| *B29D 99/00* | (2010.01) |
| *B29C 47/12* | (2006.01) |
| *B29C 47/30* | (2006.01) |
| *C03B 37/04* | (2006.01) |

(52) U.S. Cl.
CPC ............ *B29D 99/0078* (2013.01); *D01D 5/18* (2013.01); *B29C 47/0014* (2013.01); *B29C 47/122* (2013.01); *B29C 47/30* (2013.01); *C03B 37/04* (2013.01); *C03B 37/045* (2013.01)

(58) Field of Classification Search
CPC .... B29D 99/0078; D01D 5/18; C03B 37/045; C03B 37/04; B29C 47/30; B29C 47/122; B29C 47/0014
USPC ........ 264/8, 211.12; 425/8, 72.2, 464, 382 R, 425/382.2, 382.3
See application file for complete search history.

(56) References Cited

U.S. PATENT DOCUMENTS

| | | | |
|---|---|---|---|
| 3,622,293 A | 11/1971 | Firnhaber | |
| 3,776,669 A * | 12/1973 | Ito | ............................ D01D 5/18 425/289 |
| 3,928,009 A | 12/1975 | Perry | |
| 5,114,631 A * | 5/1992 | Nyssen | ..................... D04H 1/56 264/115 |

(Continued)

FOREIGN PATENT DOCUMENTS

| | | |
|---|---|---|
| EP | 0 801 040 A2 | 10/1997 |
| WO | WO 91/13836 A1 | 9/1991 |

(Continued)

*Primary Examiner* — Nahida Sultana
(74) *Attorney, Agent, or Firm* — Reinhart Boerner Van Deuren P.C.

(57) ABSTRACT

Described herein are apparatuses and methods of creating fibers, such as microfibers and nanofibers. The methods discussed herein employ centrifugal forces to transform material into fibers. Apparatuses that may be used to create fibers are also described. To improve the formation of fibers, various devices and systems for controlling the micro-environment around the fiber producing device are described.

17 Claims, 24 Drawing Sheets

(56) References Cited

U.S. PATENT DOCUMENTS

| | | | | |
|---|---|---|---|---|
| 5,743,157 A * | 4/1998 | Hinze | | B21D 22/16 65/516 |
| 6,141,992 A | 11/2000 | Gross et al. | | |
| 2006/0040008 A1 * | 2/2006 | Geus | | D01D 5/088 425/72.2 |
| 2006/0273483 A1 * | 12/2006 | Vakili | | D01D 5/092 264/103 |
| 2008/0029617 A1 * | 2/2008 | Marshall | | D01D 5/0038 239/214.17 |
| 2008/0233224 A1 * | 9/2008 | Rosse | | A23P 1/12 425/8 |
| 2009/0232920 A1 * | 9/2009 | Lozano | | D01D 5/18 425/72.2 |
| 2009/0256278 A1 * | 10/2009 | Harris | | D01D 5/088 264/211.12 |
| 2010/0072674 A1 * | 3/2010 | Takahashi | | D01D 5/0038 264/465 |
| 2010/0148405 A1 * | 6/2010 | Sumida | | D01D 5/0061 264/465 |
| 2011/0059261 A1 * | 3/2011 | Sumida | | D01D 5/0061 427/459 |
| 2011/0156319 A1 * | 6/2011 | Kurokawa | | D01D 5/0061 264/466 |
| 2011/0303132 A1 * | 12/2011 | Knopf | | F23B 10/00 110/203 |
| 2014/0159263 A1 * | 6/2014 | Lozano | | D01D 5/18 264/8 |
| 2015/0284541 A1 * | 10/2015 | Urayama | | B29B 17/02 423/447.1 |
| 2016/0040319 A1 * | 2/2016 | Zembrodt | | D01D 4/02 264/166 |
| 2016/0082620 A1 * | 3/2016 | Dahlheimer | | B29B 9/06 425/67 |

FOREIGN PATENT DOCUMENTS

| | | |
|---|---|---|
| WO | WO 2005/061763 A1 | 7/2005 |
| WO | WO 2007/089710 A1 | 8/2007 |

* cited by examiner

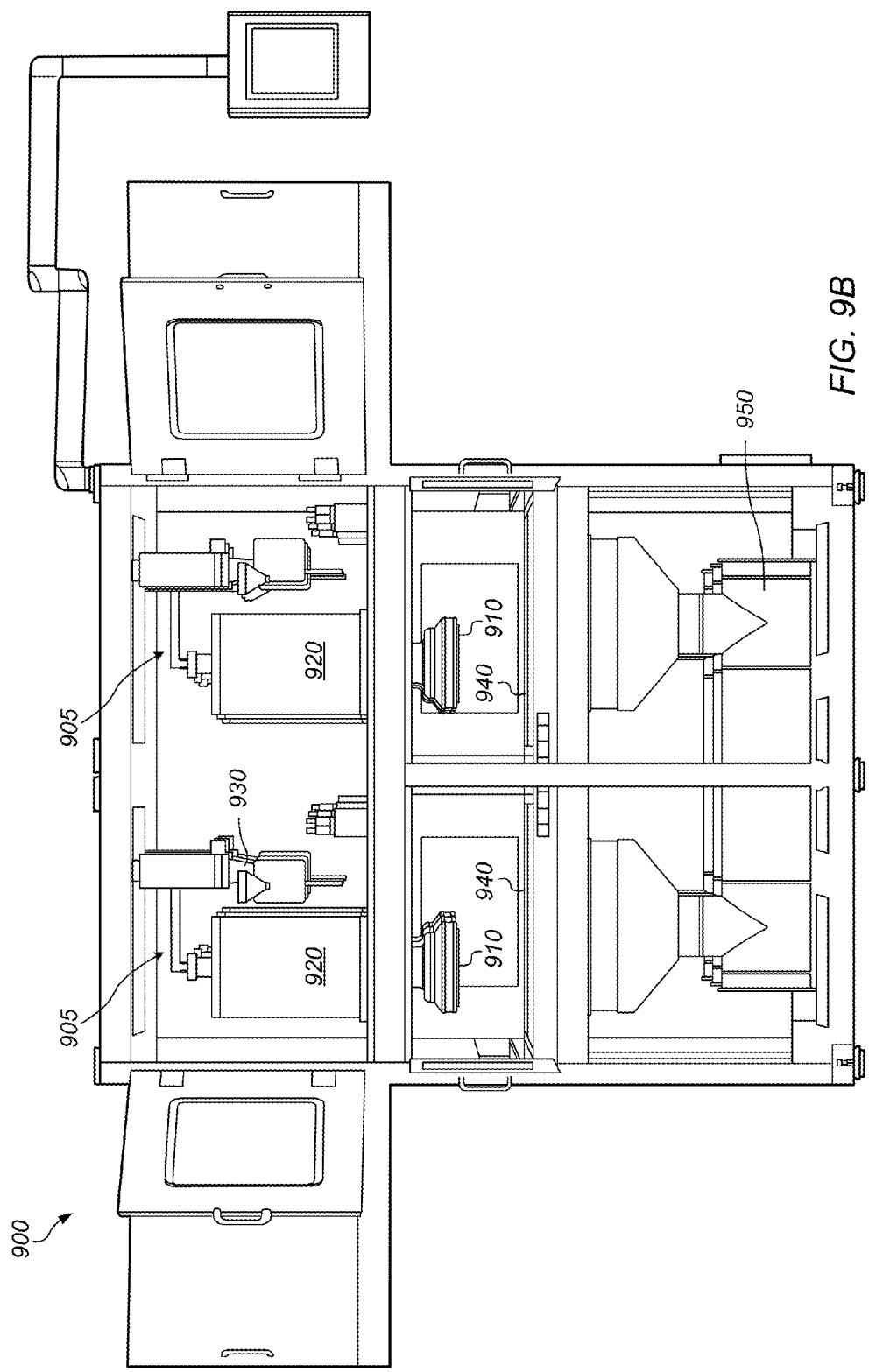

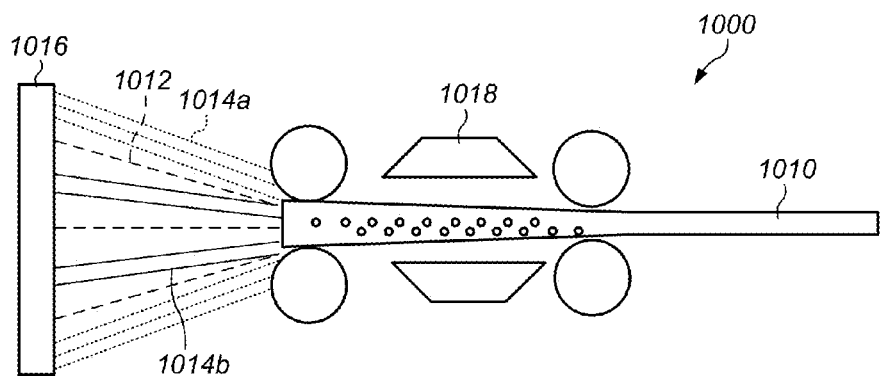
FIG. 10
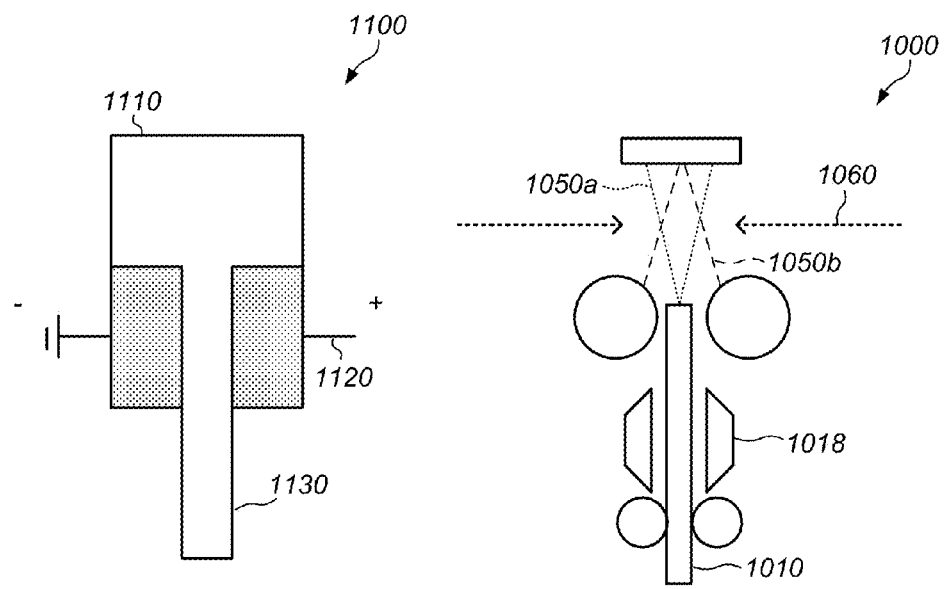
FIG. 11
FIG. 12

DEVICES AND METHODS FOR THE PRODUCTION OF MICROFIBERS AND NANOFIBERS IN A CONTROLLED ENVIRONMENT

PRIORITY CLAIM

This application claims the benefit of U.S. Provisional Application No. 61/680,109 filed on Aug. 6, 2012 and U.S. Provisional Application No. 61/776,054 filed on Mar. 11, 2013, both of which are incorporated herein by reference.

BACKGROUND OF THE INVENTION

1. Field of the Invention

The present invention generally relates to the field of fiber production. More specifically, the invention relates to fibers of micron and sub-micron size diameters.

2. Description of the Relevant Art

Fibers having small diameters (e.g., micrometer ("micron") to nanometer ("nano")) are useful in a variety of fields from the clothing industry to military applications. For example, in the biomedical field, there is a strong interest in developing structures based on nanofibers that provide scaffolding for tissue growth to effectively support living cells. In the textile field, there is a strong interest in nanofibers because the nanofibers have a high surface area per unit mass that provide light, but highly wear resistant, garments. As a class, carbon nanofibers are being used, for example, in reinforced composites, in heat management, and in reinforcement of elastomers. Many potential applications for small-diameter fibers are being developed as the ability to manufacture and control their chemical and physical properties improves.

It is well known in fiber manufacturing to produce extremely fine fibrous materials of organic fibers, such as described in U.S. Pat. Nos. 4,043,331 and 4,044,404, where a fibrillar mat product is prepared by electrostatically spinning an organic material and subsequently collecting spun fibers on a suitable surface; U.S. Pat. No. 4,266,918, where a controlled pressure is applied to a molten polymer which is emitted through an opening of an energy charged plate; and U.S. Pat. No. 4,323,525, where a water soluble polymer is fed by a series of spaced syringes into an electric field including an energy charged metal mandrel having an aluminum foil wrapper there around which may be coated with a PTFE (Teflon™) release agent. Attention is further directed to U.S. Pat. Nos. 4,044,404, 4,639,390, 4,657,743, 4,842,505, 5,522,879, 6,106,913 and 6,111,590—all of which feature polymer nanofiber production arrangements.

Electrospinning is a major manufacturing method to make nanofibers. Examples of methods and machinery used for electrospinning can be found, for example, in the following U.S. Pat. Nos. 6,616,435; 6,713,011; 7,083,854; and 7,134,857.

SUMMARY OF THE INVENTION

In one embodiment, a system for producing microfibers and/or nanofibers includes: a fiber producing device comprising a body, the body comprising one or more openings and a coupling member, wherein the body is configured to receive material to be produced into a fiber; a driver capable of rotating the body, wherein the body is couplable to the driver through the coupling member; and one or more gas outlets positioned proximate to the fiber producing device. During use rotation of the fiber producing device causes material in the body to be passed through one or more openings to produce microfibers and/or nanofibers, The gas outlets are positioned such that the gas exiting the gas outlets controls the temperature of the environment into which the material is ejected to produce microfibers and/or nanofibers.

In an embodiment, a device for use in a microfiber and/or nanofiber producing system includes: a body; an internal cavity disposed in the body; one or more openings that allow material to be passed from the internal cavity to the exterior of the body; a coupling member, wherein the fiber producing device is couplable to a driver through the coupling member; and one or more draft members coupled to the body, wherein one or more of the draft members create a gas flow relative to the body due to rotation of the fiber producing device. The body is configured to receive a material to be produced into a fiber. During use rotation of the body causes material in the internal cavity to be passed through one or more openings to produce microfibers and/or nanofibers. The gas flow produced by one or more of the draft members conveys at least some of the produced microfibers and/or nanofibers away from the body during use.

In an embodiment, a device for use in a microfiber and/or nanofiber producing system includes: a body, an internal cavity disposed in the body, wherein the internal cavity receives material to be produced into a fiber, one or more material outlets that allow material to be passed from the internal cavity to the exterior of the body; a coupling member, wherein the body is couplable to a driver through the coupling member; and one or more gas outlets positioned proximate to the one or more of the material outlets. During use rotation of the body causes material in the internal cavity to be passed through one or more material outlets and ejected from one or more material outlets to produce microfibers and/or nanofibers and gas is passed through the gas outlets.

In an embodiment, a system for producing microfibers and/or nanofibers includes: a fiber producing device comprising a body, the body comprising one or more openings and a coupling member, wherein the body is configured to receive material to be produced into a fiber; a driver capable of rotating the body, wherein the body is couplable to the driver through the coupling member; and an electric field generator, wherein the electric field generator is positioned such that an electric field produced by the electric field generator does not aid in fiber formation. During use, rotation of the fiber producing device causes material in the body to be passed through one or more openings to produce microfibers and/or nanofibers. The electric field generator produces an electric field that inhibits agglomeration and/or entwining of the produced microfibers and/or nanofibers.

BRIEF DESCRIPTION OF THE DRAWINGS

Advantages of the present invention will become apparent to those skilled in the art with the benefit of the following detailed description of embodiments and upon reference to the accompanying drawings.

FIG. 9B depicts an embodiment of a fiber producing system opened for maintenance access;

FIG. 10 depicts an embodiment of a system for producing an in situ thermally bonded self-supporting web;

FIG. 11 depicts an embodiment a device applying a charge to a fiber;

FIG. 12 depicts an embodiment of a device which uses air currents to mix chopped fibers which are then used to for a charged self supporting web;

Figure 1:
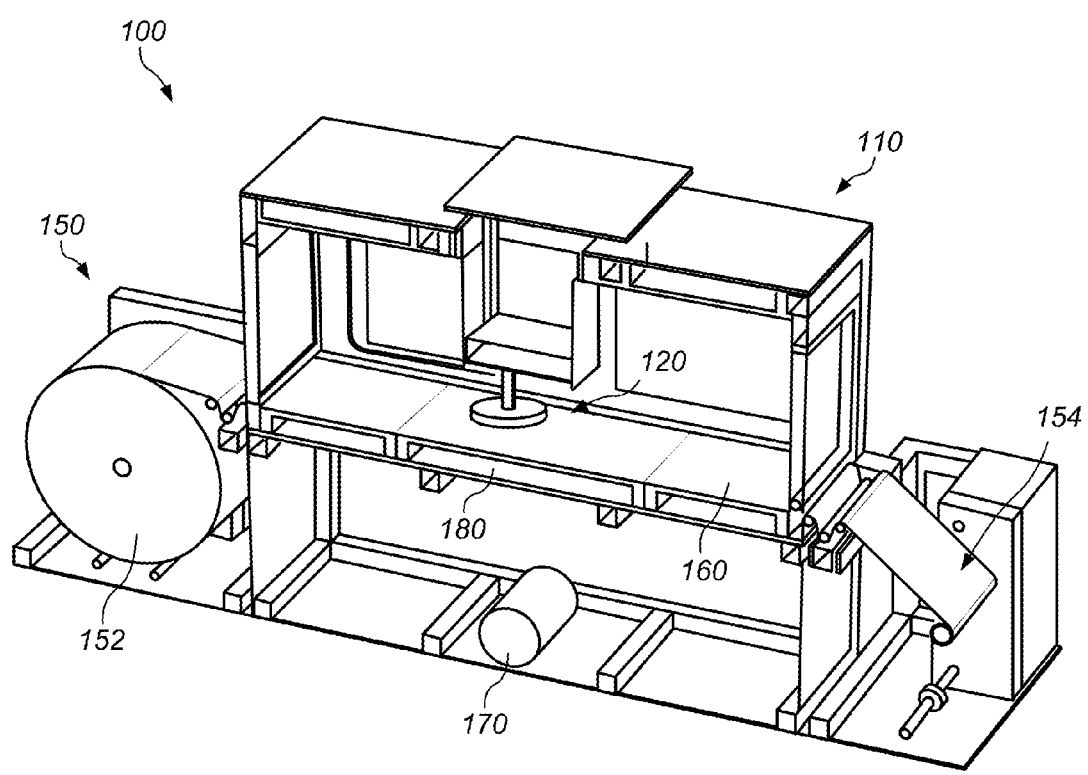
FIG. 1 depicts a fiber deposition system.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a method or apparatus that "comprises," "has," "includes" or "contains" one or more steps or elements possesses those one or more steps or elements, but is not limited to possessing only those one or more steps or elements. Likewise, an element of an apparatus that "comprises," "has," "includes" or "contains" one or more features possesses those one or more features, but is not limited to possessing only those one or more features.

Described herein are apparatuses and methods of creating fibers, such as microfibers and nanofibers. The methods discussed herein employ centrifugal forces to transform material into fibers. Apparatuses that may be used to create fibers are also described. Some details regarding creating fibers using centrifugal forces may be found in the following U.S. Published Patent Applications: 2009/0280325 entitled "Methods and Apparatuses for Making Superfine Fibers" to Lozano et al.; 2009/0269429 entitled "Superfine Fiber Creating Spinneret and Uses Thereof" to Lozano et al.; 2009/0232920 entitled "Superfine Fiber Creating Spinneret and Uses Thereof" to Lozano et al.; 2009/0280207 entitled "Superfine Fiber Creating Spinneret and Uses Thereof" to Lozano et al.; 2012/0292810 entitled "Apparatuses Having Outlet Elements and Methods for the Production of Microfibers and Nanofibers" to Peno; 2012/0294966 entitled "Multilayer Apparatuses and Methods for the Production of Microfibers and Nanofibers" to Peno et al.; 2012/0295021 entitled "Apparatuses and Methods for the Deposition of Microfibers and Nanofibers on a Substrate" to Peno et al.; 2012/0292795 to entitled "Apparatuses and Methods for Simultaneous Production of Microfibers and Nanofibers" to Peno et al.; 2012/0304613 entitled "Split Fiber Producing Devices and Methods for the Production of Microfibers and Nanofibers" to Peno et al.; and 2012/0292796 entitled "Devices and Methods for the Production of Coaxial Microfibers and Nanofibers" to Peno et al.; all of which are incorporated herein by reference.

An embodiment of a system 100 for depositing fibers onto a substrate is depicted in FIG. 1. System 100 includes a fiber producing system 110 and a substrate transfer system 150. Fiber producing system 110 includes a fiber producing device 120, as described herein. Fiber producing system produces and directs fibers produced by a fiber producing device toward a substrate 160 disposed below the fiber producing device during use. Substrate transfer system moves a continuous sheet of substrate material through the deposition system.

Figure 2:
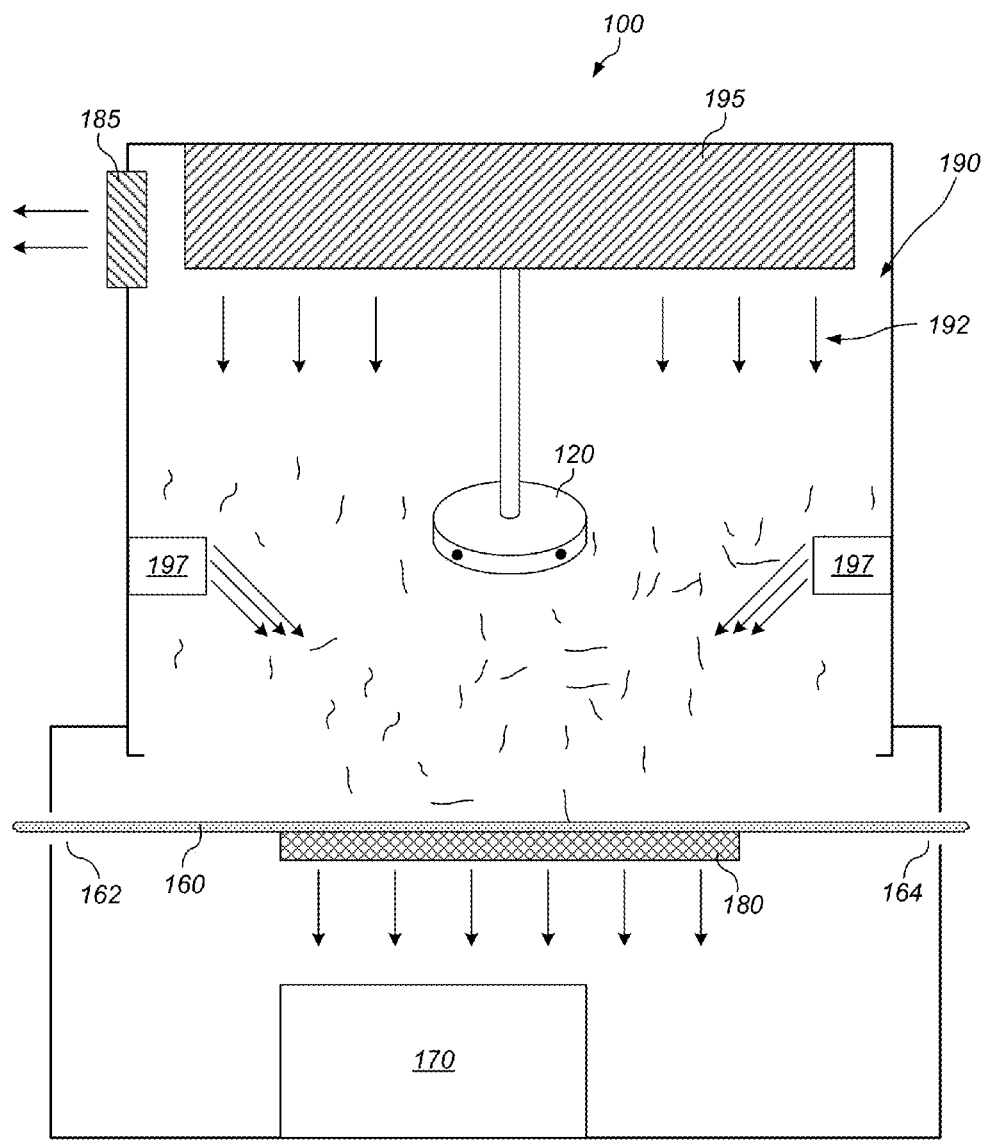
FIG. 2 depicts a schematic diagram of a fiber deposition system in use.

System 100, in one embodiment, includes a top mounted fiber producing device 120. During use, fibers produced by fiber producing device 120 are deposited onto substrate 160. A schematic diagram of system 100 is depicted in FIG. 2. Fiber producing system 110 may include one or more of: a vacuum system 170, an electrostatic plate 180, and a gas flow system 190. A vacuum system produces a region of reduced pressure under substrate 160 such that fibers produced by fiber producing device 110 are drawn toward the substrate due to the reduced pressure. Alternatively, one or more fans may be positioned under the substrate to create an air flow through the substrate. Gas flow system 190 produces a gas flow 192 that directs fibers formed by the fiber producing device toward the substrate. Gas flow system may be a pressurized air source or one or more fans that produce a flow of air (or other gases). The combination of vacuum and air flow systems are used to produce a "balanced air flow" from the top of the deposition chamber through the substrate to the exhaust system by using forced air (fans, pressurized air) and exhaust air (fans, to create an outward flow) and balancing and directing the airflow to produce a fiber deposition field down to the substrate. System 100 includes substrate inlet 162 and substrate outlet 164.

An electrostatic plate 180 is also positioned below substrate 160. The electrostatic plate is a plate capable of being charged to a predetermined polarity. Typically, fibers produced by the fiber producing device have a net charge. The net charge of the fibers may be positive or negative, depending on the type of material used. To improve deposition of charged fibers, electrostatic plate 180 may be disposed below substrate 160 and be charged to an opposite polarity as the produced fibers. In this manner, the fibers are attracted to the electrostatic plate due to the electrostatic attraction between the opposite charges. The fibers become embedded in the substrate as the fibers move toward the electrostatic plate.

A pressurized gas producing and distribution system may be used to control the flow of fibers toward a substrate disposed below the fiber producing device. During use fibers produced by the fiber producing device are dispersed within the deposition system. Since the fibers are composed primarily of microfibers and/or nanofibers, the fibers tend to disperse within the deposition system. The use of a pressurized gas producing and distribution system may help guide the fibers toward the substrate. In one embodiment, a gas flow system 190 includes a downward gas flow device 195 and a lateral gas flow device 197. Downward gas flow device 195 is positioned above or even with the fiber producing device to facilitate even fiber movement toward the substrate. One or more lateral gas flow devices 197 are oriented perpendicular to or below the fiber producing device. In some embodiment, lateral gas flow devices 197 have an outlet width equal to the substrate width to facilitate even fiber deposition onto substrate. In some embodiments, the angle of the outlet of one or more lateral gas flow devices 197 may be varied to allow better control of the fiber deposition onto the substrate. Each lateral gas flow devices 197 may be independently operated.

During use of the deposition system, fiber producing device 120 may produce various gasses due to evaporation of solvents (during solution spinning) and material gasification (during melt spinning) Such gasses, if accumulated in the deposition system may begin to affect the quality of the fiber produced. In some embodiment, the deposition system includes an outlet fan 185 to remove gasses produced during fiber production from the deposition system.

Substrate transfer system 150, in one embodiment depicted in FIG. 1, is capable of moving a continuous sheet of substrate material through the deposition system. In one embodiment, substrate transfer system 150 includes a substrate reel 152 and a take up reel system 154. During use, a roll of substrate material is placed on substrate reel 152 and threaded through system 100 to the substrate take up reel system 154. During use, substrate take up reel system 154 rotates, pulling substrate through deposition system at a predetermined rate. In this manner, a continuous roll of a substrate material may be pulled through fiber deposition system.

Figure 3A:
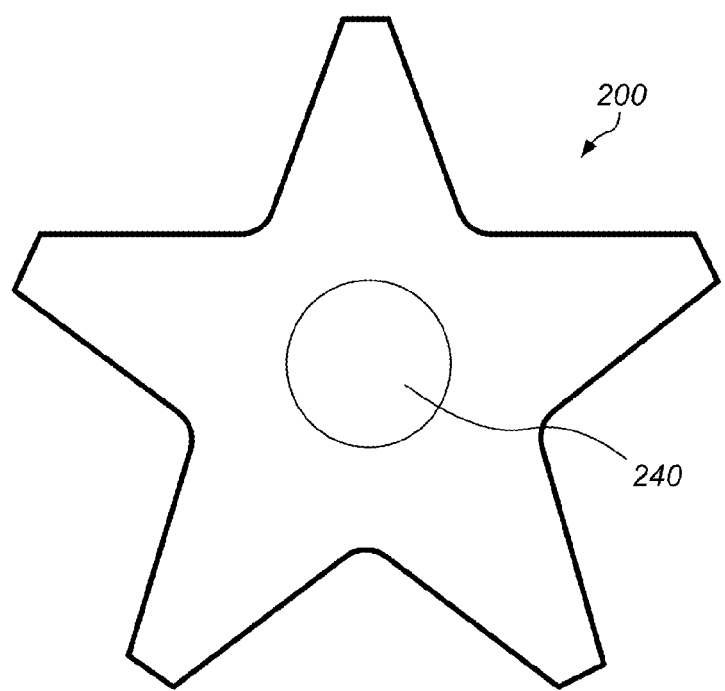
FIGS. 3A-B depict a star shaped fiber producing device.
Figure 3B:
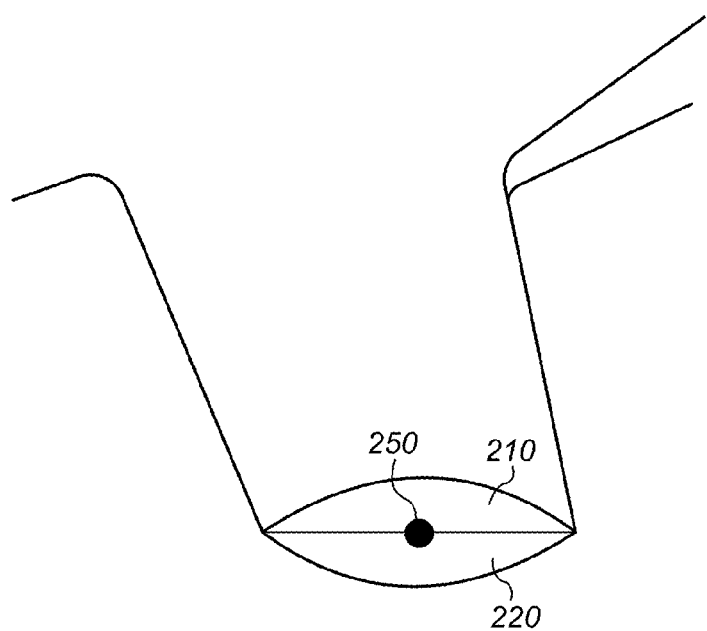
Figure 4:
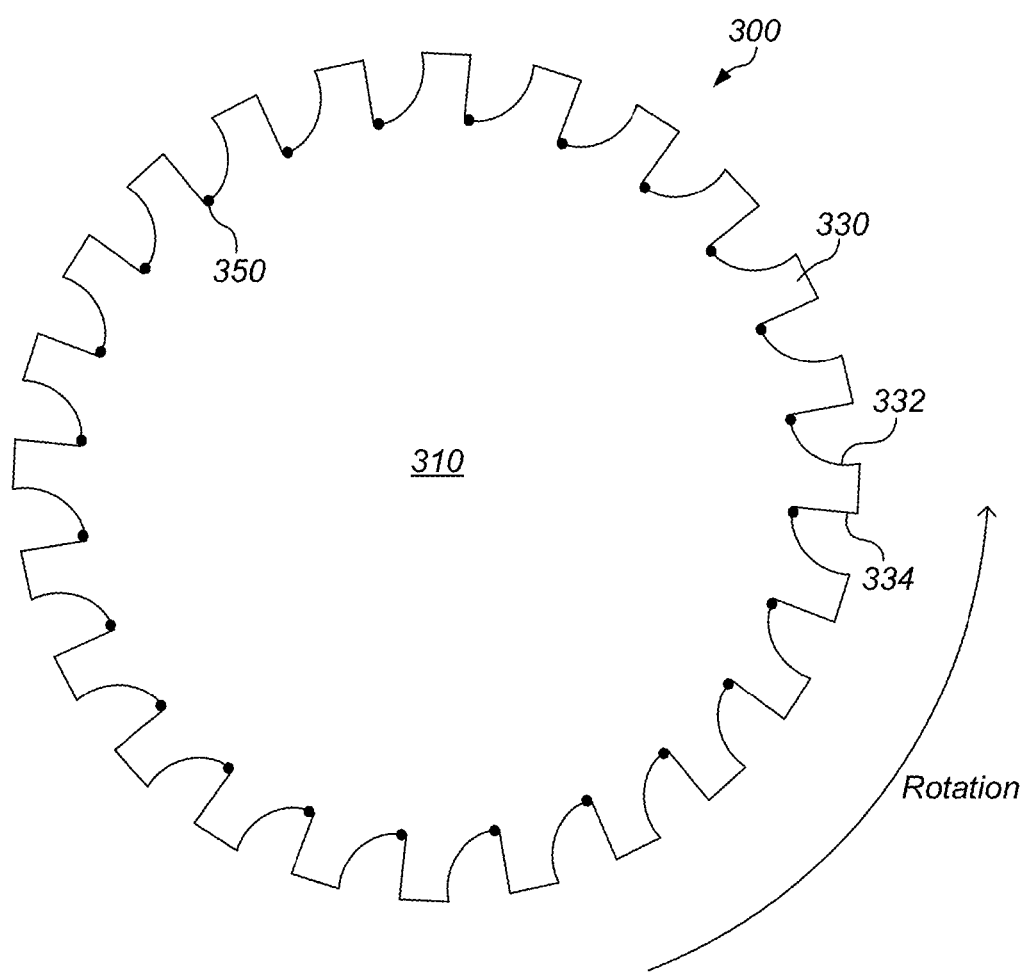
FIG. 4 depicts a gear shaped fiber producing device.
Figures 5A, 5B:
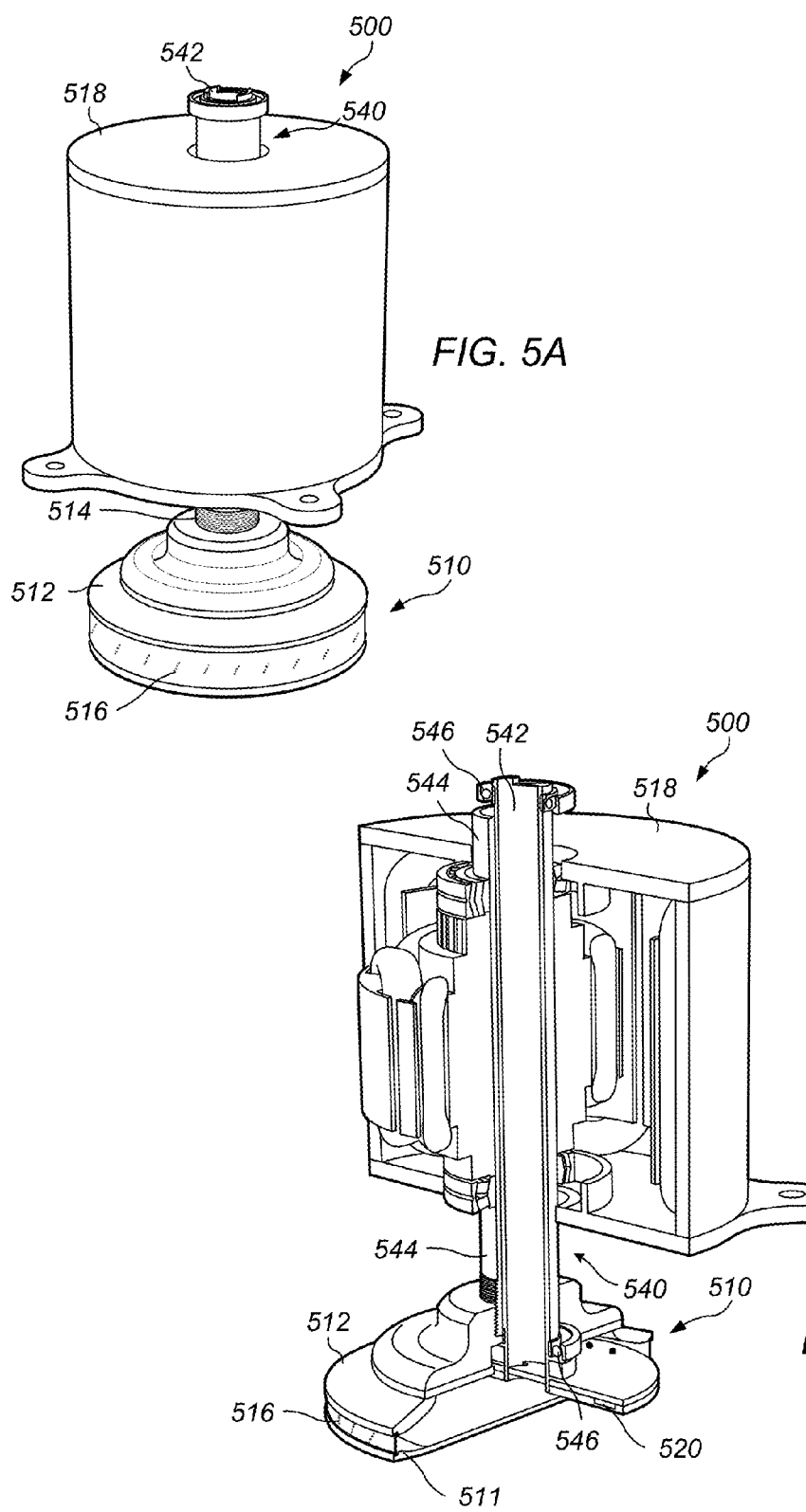
FIG. 5A depicts an embodiment of a fiber producing system with a driver mounted above the fiber producing device.
FIG. 5B depicts an embodiment of a cross section of a fiber producing system with a driver mounted above the fiber producing device.
Figure 5C:
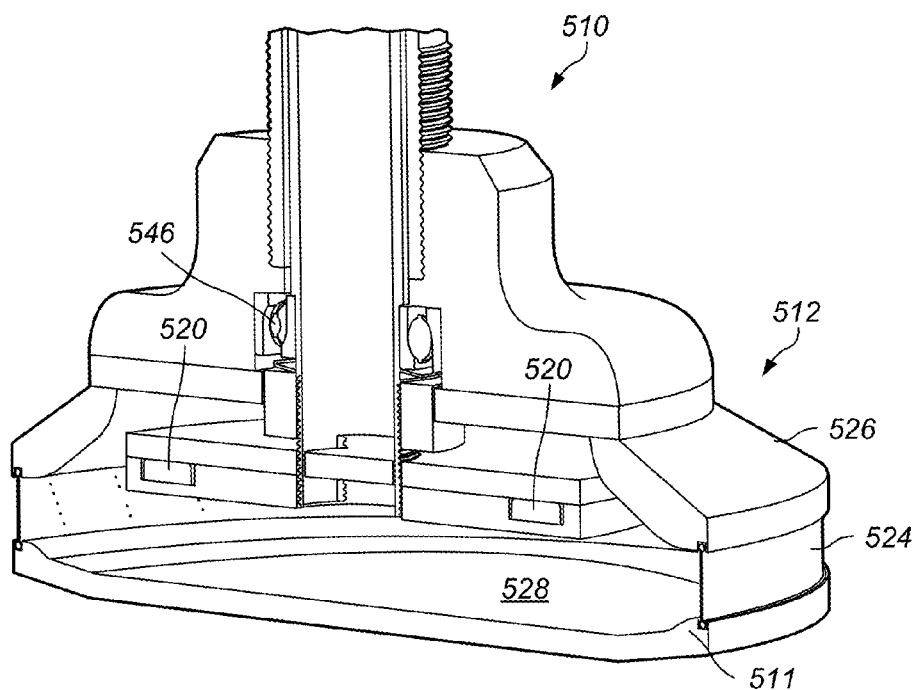
FIG. 5C depicts an embodiment of a cross section of a body of a fiber producing system.
Figure 5D:
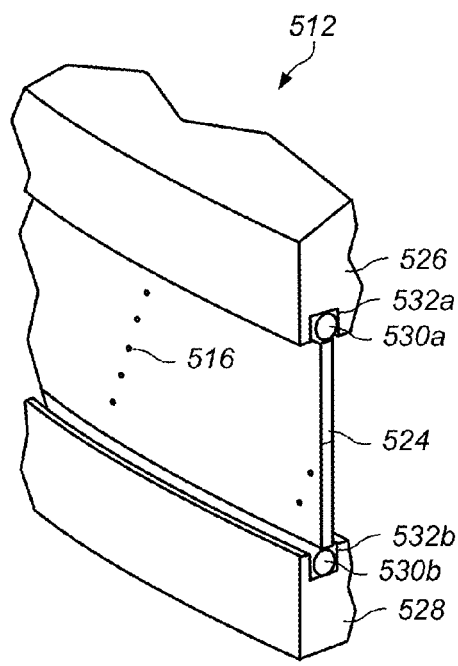
FIG. 5D depicts an embodiment of a cross section of a body of a portion of a sidewall, top member, and bottom member of a fiber producing system.

Fiber producing devices may be formed in different shapes. Non-limiting examples of fiber producing devices having alternate shapes are depicted in FIGS. 3A-B and FIG. 4. In an embodiment depicted in FIG. 3A, fiber producing device 200 includes a body that is in the form of a star. The body of the fiber producing device is composed of a first member 210 and a second member 220, as depicted in FIG. 3B. The body is formed by coupling first member 210 to second member 220. First and second members couple together by contacting first member coupling surface with second member coupling surface. In some embodiments, it is desirable that grooves of the first member are substantially aligned with groves of the second member. When the grooves are aligned, the grooves together form one or more openings 250 extending from the interior cavity to an outer surface of the body. During use, rotation of the body material disposed in the internal cavity of the body is ejected through one or more openings 250 to produce microfibers and/or nanofibers. Material may be placed into the body of fiber producing through a first member opening formed in first member 210. In one embodiment, material is added to the internal cavity through a central opening 240 of the first member. In some embodiments, each arm of fiber producing device 200 may have an aerodynamic profile. The use of an aerodynamic profile may reduce drag forces on the fiber producing device as the device is spun during use. Additionally, the arms may be adjusted such that the plane of the arms is substantially angled with respect to a plane perpendicular to the axis of rotation of the fiber producing device. Angling the arms may allow the arms to act as a fan blade during use. The angled arms, for example, may create a downward flow of gas, which will push the fibers away from the fiber producing device during use.

In another embodiment, a gear shaped fiber producing device, as depicted in FIG. 4 may be used to produce nanofibers and/or microfibers. Gear shaped fiber producing device 300 may be formed from a single unitary device, or from two or more separate pieces that are coupled together as had been described above. Fiber producing device 300 includes a plurality of protruding segments 330 extending from central body 310. Each segment 330 is defined by sidewalls 332 and 334. Sidewalls 332 are substantially straight, while sidewalls 334 are curved. The segments 330 are positioned such that the straight sidewalls 332 of a segment are positioned across from the curved sidewall of an adjacent segment 334. Thus a gap is formed between the segments having a curved and straight boundary.

In contrast to other fiber producing devices, openings 350 are formed in between the protruding segments 330, rather than at the end of the segments. During use, material disposed in the body of fiber producing device 300 is ejected through openings 350. When the fiber producing device is rotating, the material exits openings 350 and is carried to the curved sidewalls 334. The material runs along the curved sidewalls and is ejected from the fiber producing device. The amount of arc on curved sidewalls 334 may be adjusted to alter the size and/or direction that the fibers are produced.

An embodiment of a fiber producing system is depicted in FIGS. 1A-D. Fiber producing system 500 includes a fiber producing device 510. Fiber producing device 510 includes a body 512 and a coupling member 540. Body 512 comprises one or more openings 516 through which material disposed in the body may pass through during use. Fiber producing device 510 may be coupled to a driver 518 using a coupling member 540. Coupling member 540 couples fiber producing device 510 to driver 518, allowing the driver to rotate the fiber producing device during use.

In some embodiments, materials used to form fibers may conveyed into a body of a fiber producing device. In some embodiments, the material may be conveyed to the body under pressure in the form of a pressurized fluid. The material may be in the form of a solution or suspension in a suitable liquid, or the material may be in molten or melted form. Pressurized feed of materials into a fiber producing device may facilitate fiber production by forcing the materials through the openings in addition to the force provided by the spinning body of the device. A pressurized feed system may allow for produced fibers to be ejected from the openings at a higher velocity. A pressurized feed system may also allow for cleaning the fiber producing device by conveying gasses and/or solvents under pressure through the device to facilitate cleaning.

In some embodiments, coupling member 540 includes a material delivery conduit 542 that may be used to convey materials to body 512. Material conduit 542 may convey materials through driver 518 (e.g., as depicted in FIG. 1B). Conveying materials through material delivery conduit 542 may allow the material to be delivered in an atmosphere other than air/oxygen. For example, using an inert gas to pressurize the fluid (e.g., nitrogen or argon) allows delivery of air or oxygen sensitive materials to the fiber producing device.

Coupling member 540 also includes a driving conduit 544. Driving conduit 544 is coupled to body 512 of the fiber producing device and driver 518. During use, operation of driver 518 causes driving conduit 544 to rotate which, in turn, causes fiber producing device 510 to rotate. In an embodiment, material delivery conduit 542 is disposed within driving conduit 544. During use, material delivery conduit 542 remains substantially stationary while driving conduit 544 rotates around the material delivery conduit. Coupling member 540 may include one or more bearings 546 which are positioned between driving conduit 544 and material delivery conduit 542. During use, bearings 546 provide a surface for driving conduit 544 to rotate around material delivery conduit 542. Bearings 546 also create a gap between driving conduit 544 and material delivery conduit 542. This gap helps to inhibit contact of driving conduit 544 with the material delivery conduit 542. The gap also serves as an insulating space which helps maintain the temperature of any material passing through material delivery conduit 542.

The interior cavity of the body may include angled or rounded walls 511 to help direct material disposed in body 512 toward openings 516. In some embodiments, an interior cavity of body 512 may have few or no angled or rounded walls to help direct material disposed in body 512 because such angled walls are not necessary due to the material and/or the speed at which the body is spinning during the process.

In some embodiment, fiber producing device 510 may include internal heating device 520 (e.g., depicted in FIGS. 1B-1C). Heating device 520 may function to heat material conveyed into body 512 facilitating the production of fibers as the material is conveyed through one or more openings 516. Heating device 520 may heat material inductively or radiantly. In some embodiments, a heating device may heat material conductively, inductively or radiantly. In some embodiments, a heating device may heat material using RF, lasers, or infrared.

In some embodiments, heating device 520 maybe coupled to material delivery conduit and remain substantially motionless in relation to body 512 during use such that as body 512 spins, heating device 520 remains relatively motionless. In some embodiments, one or more wires (not shown) may be coupled to material delivery conduit to supply power to heating device 520.

In some embodiments, a driver may include a direct drive coupled to a body of a fiber producing device. A direct drive system may increase the efficiency of the fiber producing system. Direct drive mechanisms are typically devices that take the power coming from a motor without any reductions (e.g., a gearbox). In addition to increased efficiency a direct drive has other advantages including reduced noise, longer lifetime, and providing high torque a low rpm. Material delivery conduit 522 may in some embodiments convey materials through driver 518 (e.g., as depicted in FIG. 1B), in some embodiments driver 518 may include a direct driver.

FIG. 1D depicts an embodiment of a cross section of a body 512 of a portion of a sidewall 524, top member 526, and bottom member 528 of a fiber producing system. Fiber producing system 500 includes a fiber producing device 510. Fiber producing device 510 includes a body 512 and a coupling member 540. Body 512 comprises one or more openings 516 through which material disposed in the body may pass through during use. Sidewall 524 may include a plurality of openings 516. In some embodiments, the plurality of openings may include a patterned array of openings. The patterned array may include a repeating pattern. The pattern may be such that no opening in the pattern is aligned vertically with another opening. The pattern may be such as to include a minimum distance between openings horizontally. In some embodiments, a pattern may inhibit entwining of fibers. Inhibition of fiber entwining or "roping" may result in a more consistent fiber product and better product.

Different patterns of openings may be desired and/or one or more openings may become clogged during normal use. In some embodiments, sidewall 524 of body 512 may be replaced without having to replace any other components of a fiber producing device. Sidewall 524 may be couplable to top member 526, and bottom member 528 of a fiber producing system. Edges 530a and 530b of a sidewall may fit within channels 532a and 532b of top member 526 and bottom member 528 respectively. Edges 530 may function to couple sidewall 524 to top member 526 and bottom member 528. In some embodiments, the edges of the sidewall may form a friction fit with the channels of the top and bottom members. In some embodiments, the edges of the sidewall may have a cross section similar to a cross section of the channels of the top and bottom members such that the edges may slide into the channels in a lateral direction but inhibited from being pulled out of the channels in any other direction.

In some embodiments, a fiber producing device may include a body. The body may be formed such that a portion of the body may function to facilitate conveyance of produced fibers away from the body. Body of a fiber producing device may include one or more draft members. In some embodiments, a fiber producing device may include two or more draft members. In some embodiments, a fiber producing device may include four draft members. FIGS. 6, 7, and 8 depict embodiments of a body of a fiber producing device with draft members. Draft members may function as blades on a fan creating a gas flow relative to the body when the fiber producing device is rotated. The gas of the glass flow is composed of the gas in the environment surrounding the fiber producing device. For example, the gas may be air, if the fiber producing device is run under ambient conditions. If the fiber producing device is run in an enclosed, controlled environment (e.g., argon, nitrogen), the created gas flow is composed of the gas in the enclosure. The gas flow created by the draft members may facilitate movement of the produced fibers away from the fiber producing device. The gas flow may direct the produced fibers in a fiber producing system. In some embodiments, draft members may be angled with respect to a plane perpendicular to the axis of rotation. Thus, draft members may be angled, much like blades of a fan, increasing the amount of gas flow produced by the draft members. In some embodiments, an angle of the draft members may be adjusted by a user in order to increase/decrease the amount of gas flow produced during use. Upon adjustment the draft members may be locked into place.

Figure 6A:
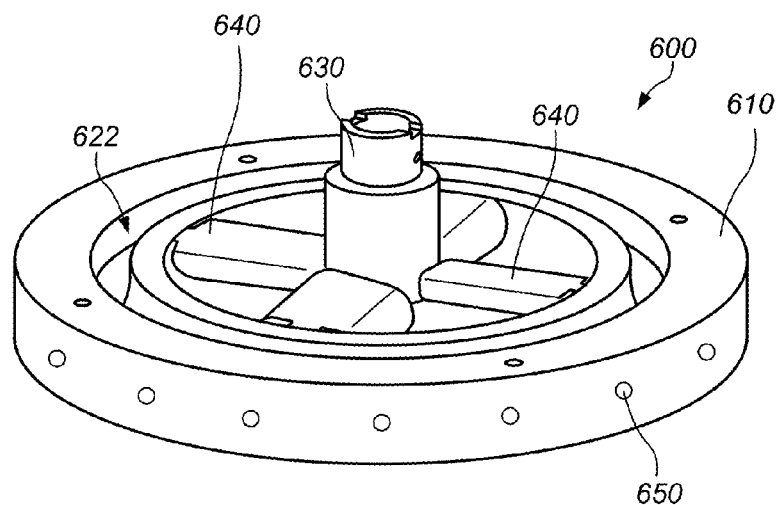
FIG. 6A depicts an embodiment of a body of a fiber producing device with four internal draft members.
Figure 6B:
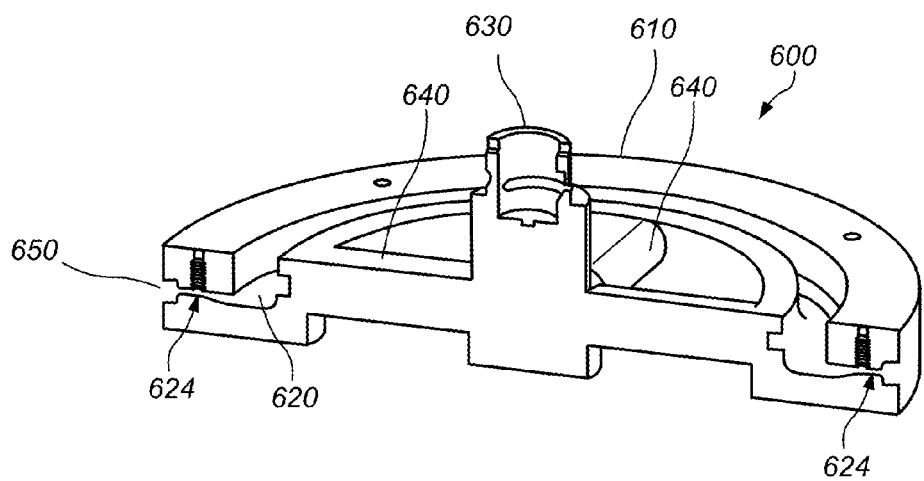
FIG. 6B depicts a cross section of an embodiment of a body of a fiber producing device with four internal draft members.

FIGS. 6A-B depict embodiments of a fiber producing device 600. Fiber producing device 600 includes a body 610 having an internal cavity 620. Internal cavity 620 holds material to be produced into fiber during use. Fiber producing device 600 also includes a coupling member 630, which is used to couple the fiber producing device to a driver (not shown). Fiber producing device 600 also includes one or more draft members 640 coupled to body 610. During use, draft members 640 create a gas flow relative to body 610 when the fiber producing device is rotated. The embodiment depicted in FIGS. 6A and 6B, will create a flow of gas along the axis of rotation in a direction away from a driver coupled to coupling member 630. During rotation of fiber producing device 600, material disposed in internal cavity 620 passes through one or more openings 650 to produce microfibers and/or nanofibers. The gas flow produced by draft members 640 conveys at least some of the produced microfibers and/or nanofibers away from body 610 during use. As shown, at least a portion of draft members 640 may be angled with respect to a plane perpendicular to the axis of rotation of the fiber producing device. As depicted in FIG. 6A, the axis of rotation extends vertically through the center of coupling member 630, and thus, a plane perpendicular to this axis would extend out of and behind the paper.

In an embodiment, body 610 is a ring-shaped substrate which defines an internal cavity 620, which will also be ring-shaped. In the embodiment depicted, draft members 640 couple the ring-shaped substrate to coupling member 630. Channel 622 may function as a material input channel, wherein material is deposited into the channel and passes through the channel into internal cavity 620, before being spun out of openings 650 and produced into fibers. As depicted in FIG. 6B, body 610 may include an inclined pressure channel 624 which functions to increase the pressure of material as the material is forced out the openings in the ring portion. Inclined pressure channel 624 may include a narrowing of the channel which then widens out before the openings.

Figure 7A:
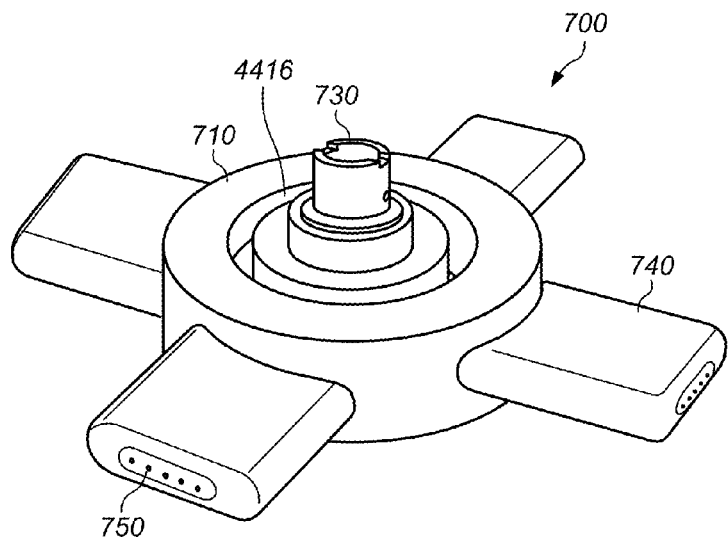
FIG. 7A depicts an embodiment of a body of a fiber producing device with four external draft members.
Figure 7B:
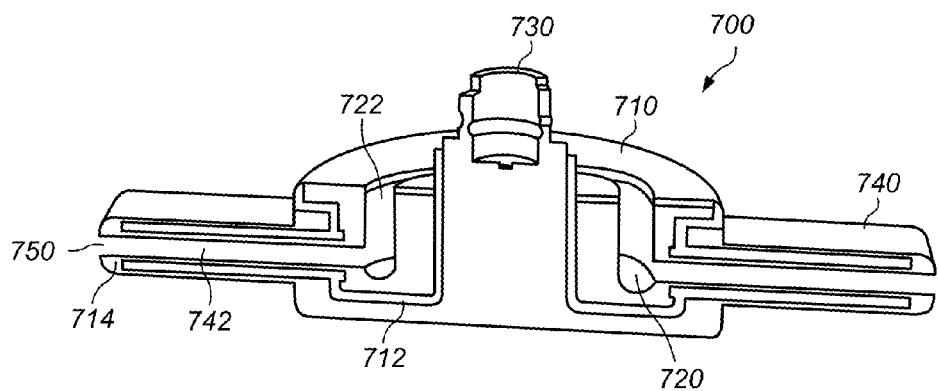
FIG. 7B depicts a cross section of an embodiment of a body of a fiber producing device with four external draft members.
Figure 8A:
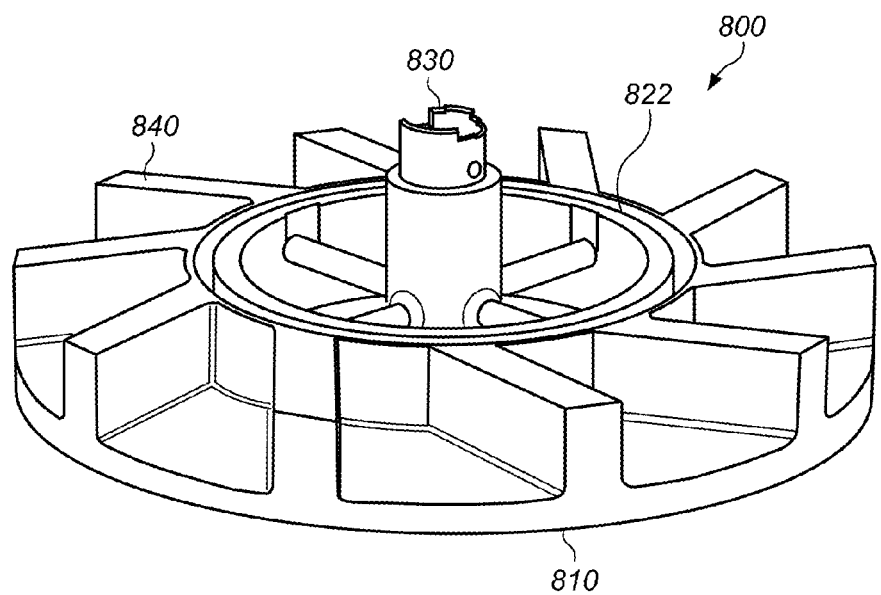
FIG. 8A depicts an embodiment of a body of a fiber producing device with a plurality of external draft members.
Figure 8B:
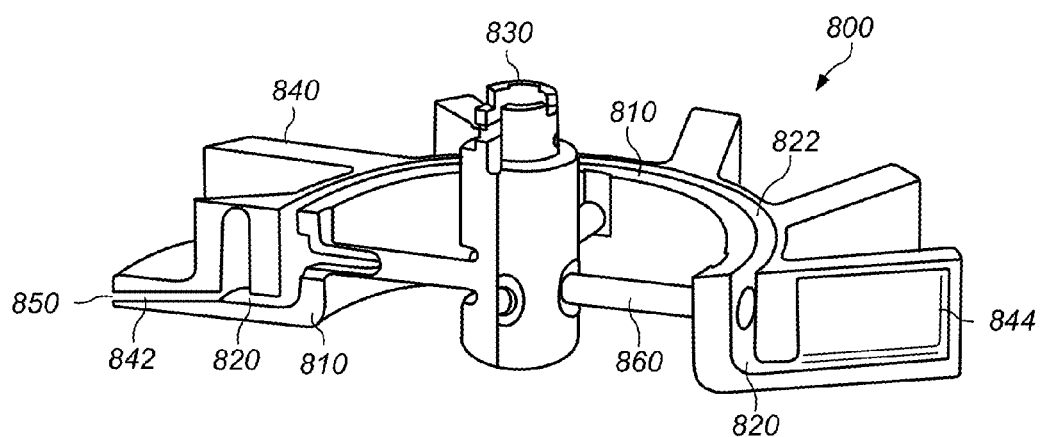
FIG. 8B depicts a cross section of an embodiment of a body of a fiber producing device with a plurality of external draft members.

FIGS. 7A-B depict embodiments of a fiber producing device 700. Fiber producing device 700 includes a body 710 having an internal cavity 720. Internal cavity 720 holds material to be produced into fiber during use. Fiber producing device 700 also includes a coupling member 730, which is used to couple the fiber producing device to a driver (not shown). Fiber producing device 700 also includes one or more draft members 740 coupled to body 710. During use, draft members 740 create a gas flow relative to body 710 when the fiber producing device is rotated. The embodiment depicted in FIGS. 7A and 7B, will create a flow of gas along the axis of rotation in a direction away from a driver coupled to coupling member 730. During rotation of fiber producing device 700, material disposed in internal cavity 720 passes through one or more openings 750 to produce microfibers and/or nanofibers. The gas flow produced by draft members 740 conveys at least some of the produced microfibers and/or nanofibers away from body 710 during use. As shown, at least a portion of draft members 740 may be angled with respect to a plane perpendicular to the axis of rotation of the fiber producing device. As depicted in FIG. 7A, the axis of rotation extends vertically through the center of coupling member 730, and thus, a plane perpendicular to this axis would extend out of and behind the paper.

In an embodiment, body 710 is a ring-shaped substrate which defines an internal cavity 720, which will also be ring-shaped. In the embodiment depicted, draft members 740 extend away from the ring-shaped substrate. Openings 750, in an embodiment, are formed at the end of draft member 740. Draft members 740 may include an internal channel 742 which extends through the draft member coupling openings 750 to internal cavity 720. A material input channel 722 may receive material to be formed into a fiber. Material deposited into material input channel 722 passes through the channel into internal cavity 720, through internal channel 742 of the draft members, and out of openings 750 to be produced into fibers. As depicted in FIG. 7B, body 710 may be formed from layers of insulating material 712 and heat transmitting material 714.

FIG. 8 depicts an embodiment of a fiber producing device 800 with a plurality of external draft members 840 coupled to body 810 forming a device which resembles an impeller. Fiber producing device 800 includes a body 810 having an internal cavity 820. Internal cavity 820 holds material to be produced into fiber during use. Fiber producing device 800 also includes a coupling member 830, which is used to couple the fiber producing device to a driver (not shown). Fiber producing device 800 also includes one or more draft members 840 coupled to body 810. During use, draft members 840 create a gas flow relative to body 810 when the fiber producing device is rotated. During rotation of fiber producing device 800, material disposed in internal cavity 820 passes through one or more openings 850 to produce microfibers and/or nanofibers. The gas flow produced by draft members 840 conveys at least some of the produced microfibers and/or nanofibers away from body 810 during use. As shown, at least a portion of draft members 840 may be angled with respect to a plane perpendicular to the axis of rotation of the fiber producing device. As depicted in FIG. 7A, the axis of rotation extends vertically through the center of coupling member 830, and thus, a plane perpendicular to this axis would extend out of and behind the paper.

In an embodiment, body 810 is a ring-shaped substrate which defines an internal cavity 820, which will also be ring-shaped. One or more coupling rods 860 couple the ring-shaped substrate to coupling member 830. In the embodiment depicted, draft members 840 include a raised member 844, which are aligned with the axis of rotation of the fiber producing device. During rotation of the fiber producing device, raised members 844 create a gas flow in a direction both perpendicular to the axis of rotation and parallel to the axis of rotation. Openings 850, in an embodiment, are formed at the end of draft member 840. Draft members 840 may include an internal channel 842 which extends through the draft member coupling openings 850 to internal cavity 820. A material input channel 822 may receive material to be formed into a fiber. Material deposited into material input channel 822 passes through the channel into internal cavity 820, through internal channel 842 of the draft members, and out of openings 850 to be produced into fibers.

Figure 9A:
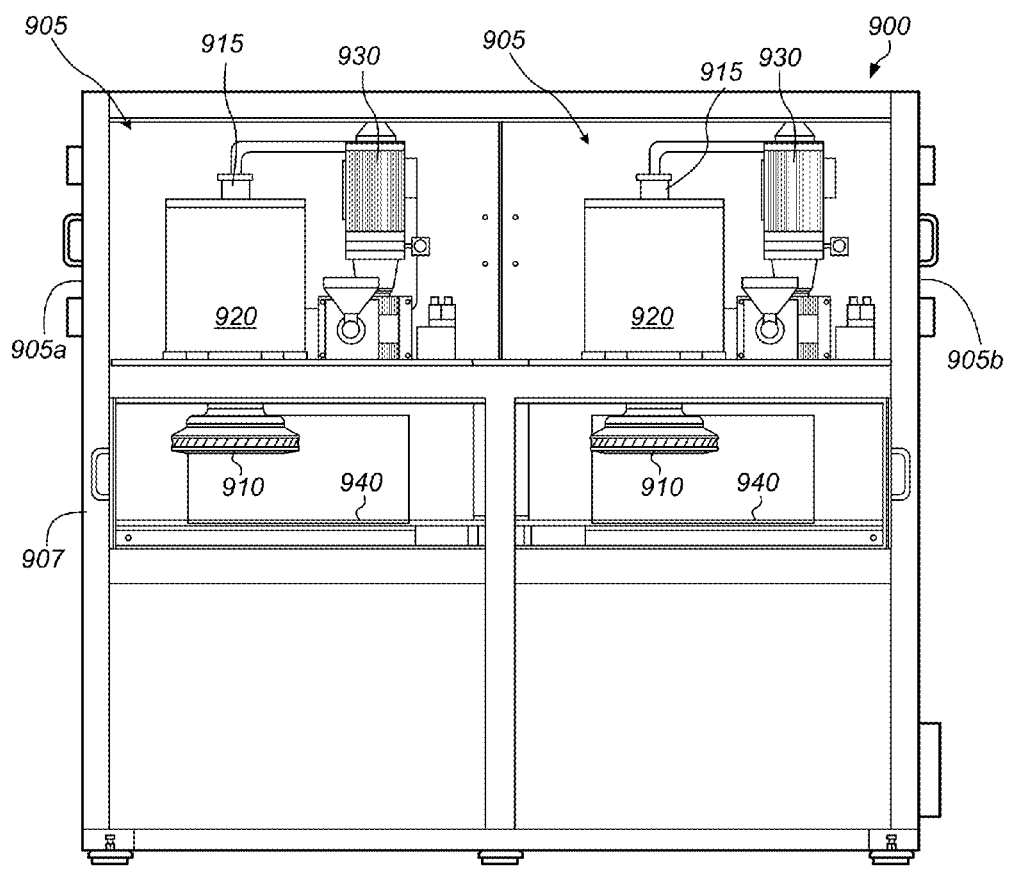
FIG. 9A depicts an embodiment of a fiber producing system.

FIGS. 9A-B depict an embodiment of a fiber producing system 900. FIG. 9B depicts an embodiment of fiber producing system 900 with access panels open for maintenance. Fiber producing system 900 includes a plurality of fiber producing modules 905 which each include a fiber producing device 910, a driver 920 and a material delivery system 930. There is theoretically no limit to the number of fiber producing modules 905 that may be coupled together in a fiber producing system 900. In some embodiments, fiber producing modules include a fiber producing system as described above in FIGS. 5A-5D. A material delivery system 930 may be coupled to the fiber producing devices 910 through coupling member 915 which extends through driver 920 as described above. In some embodiments, a fiber producing system 900 may include one or more electrostatic plates 940 which function to assist in collecting the produced fibers. A collection system may include a vacuum system 950 which pulls the produced fibers down towards a collection area.

In some embodiments, each a fiber producing module may be used to produce the same fibers, or different fibers. For example, first fiber producing module 905a may be used to produce different fibers (fibers having a different composition and/or size) than the fibers produced by second fiber producing module 905b. Each fiber producing module 905 may be adapted to be coupled to a user's personal production line. In some embodiments, the upper portion 907 of a fiber producing module may be suspended above a user's production line such that produced fibers may be applied directly to a particular user's substrate. Such a system might allow a user to incorporate fibers into their substrate production without making substantive changes to their current production facilities.

The embodiment depicted in FIGS. 9A-B may process up to about 1500 grams/minute of material (depending on the material used). The embodiment depicted may process up to 1500 milliliters of solution/minute (depending on the solvent used). Fiber producing devices 210 depicted may have a diameter of about 18 inches and include about 9000 openings for producing fibers from. In some embodiments, a fiber producing device may produce fibers with a diameter of about 100 nm to about 10+ microns, about 300 nm to about 1+ microns, or about 500 nm to about 0.8+ microns. The embodiment depicted may produce fibers with a diameter of about 300 nm to about 1+ microns. In some embodiments, a fiber producing device may produce fibers with a fiber diameter uniformity of about +/−15%, about +/−35%, or about +/−55%. Fiber diameter uniformity may be about +/−35%. In some embodiments, a fiber producing device may produce fibers with a mat lay down uniformity of about +/−5%, about +/−10%, or about +/−20%. Mat lay down uniformity may be about +/−10%.

In some embodiments, fibrous filtration and separation webs may require that the fibers in the web are "fixed" so that they form a porous structure instead of collapsing into a solid structure. In some embodiments, thermal bonding may be used to hold the fibers in place. FIG. 10 depicts an embodiment of a system 1000 for producing an in situ thermally bonded self-supporting web 1010. In thermal bonding, a small quantity of low melting point fibers 1012, also known as binder fibers, may be blended with the fibers of interest 1014a-b. The resultant web may then be heated 1018, melting the binder fibers, which provide the binder to hold the web together. In some embodiments, an array of the fiber producing devices 1016 are set up to generate fibers with one or more fiber diameters or properties along with a quantity of binder fibers. Any method for generating the binding fibers may be suitable for this method (e.g., the nanofibers from the spinning method described herein).

In some embodiments, air flows and/or forming wires may be used to guide the fibers into the calender section. The resulting web is heated to melt the binder fiber and calendered, as needed, to form the non-woven product. The use of binder fibers will permit the formation of self-supporting nanofiber webs directly from fiber producing devices without the need to collect the fibers on a carrier non-woven material.

A common method for charging polymeric fibers in filtration is by triboelectric charging. This technique takes advantage of the electrostatic charge that is created when dissimilar non-conductive materials are rubbed against each other. This is similar to the static charge one experiences in clothes made from synthetic fibers. In filtration, fibers of different materials are mechanically mixed and agitated together to create charge. The charged fibers are then formed into a web, commonly by needle punching. In some embodiments, the triboelectric charge may be created during fiber production using devices and methods described herein. An embodiment of a device 1100 configured to charge polymeric fibers using a triboelectric effect is shown in FIG. 11. In this embodiment, an extrusion head 1110, or openings, may be made of a dissimilar material than the material being extruded. An external voltage 1120 may be applied to the extrusion head 1110 to create a charge on the resulting fiber 1130 (e.g., as depicted in FIG. 48).

In some embodiments, fibers of dissimilar materials 1050a-b can be extruded simultaneously using an array of fiber producing devices and/or a multiple channel fiber producing device 1000 as depicted in FIG. 10. The resultant fiber mix may be made to interact with each other to create the charge. The fibers may be made to interact with one another by a pulsed turbulent air jets 1060 (e.g., as depicted in FIG. 49). In some embodiments, triboelectrical charging may be combined with binder fibers to create self-supporting triboelectrically charged webs. This technique is potentially applicable to any fiber production process. The nanofibers produced from the fiber production process described herein may be used to form self-supporting electrically charged nanofiber webs. Self-supporting electrically charged nanofiber webs may be used, for example, for air filtration.

Wet laid web formation is perhaps one of the most common methods for producing high performance filtration media. Wet-laying or wet forming is a process in which webs are produced by filtering an aqueous suspension of fibers on a surface which is porous as regards liquids (e.g., a screen conveyor belt). The laid webs are then bonded to each other by one or more techniques to provide fabric integrity. High performance filtration media have uses ranging from high capacity automotive filtration that use coarse cellulosic fibers to HEPA filter media and battery separators that use nano-diameter micro fiber glass. All these processes compound the desired blend of different fibers in a wet slurry to make the web on, for example, a paper machine.

Figure 13:
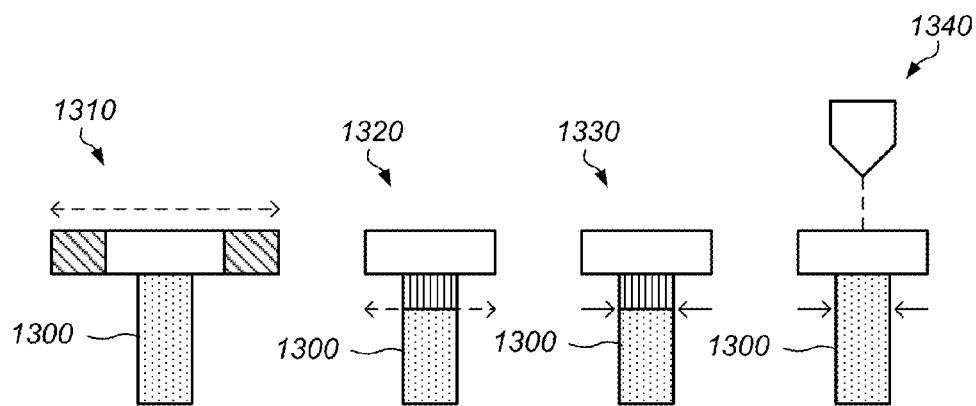
FIG. 13 depicts several embodiments of devices which are used to chop fibers.

The fiber producing devices and methods described herein may be used to produce chopped nanofibers to compete against the micro fiber glass for wet laid processes. The fiber chopping can be accomplished in one of four ways (e.g., as depicted in FIG. 13). In some embodiments, fibers 1300 may be chopped by means of vibrating extrusion heads 1310. In some embodiments, fibers 1300 may be chopped by chopping the fibers mechanically 1320 after the extrusion. In some embodiments, fibers 1300 may be chopped by chopping the fibers by air knives 1330 after extrusion. In some embodiments, fibers 1300 may be chopped by creating short fibers by intermittent feed of the polymer by vibrating feeders 1340.

Figure 14:
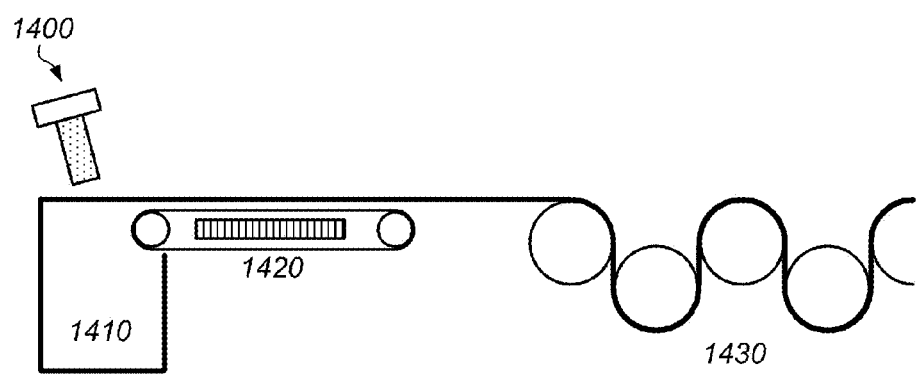
FIG. 14 depicts an embodiment of a wet laid process system.

These techniques are applicable to any of the fiber generation process described herein, but the spinning process offers the most value to the market by offering a viable and perhaps less expensive alternate to micro fiber glass. The chopped fibers offer two options. First, chopped fibers may be supplied in bulk to the media manufacturer, for use in their current wet laid processes. In the wet laid process, depicted in FIG. 14, fibers 1400 may be provided to form a fiber slurry 1410. The formed fiber slurry is then spread out along a forming device 1420 which removes much of the solvent from the spread out slurry (e.g., via vacuum). The formed fiber sheets may then be finished dryers 1430 (as depicted in FIG. 51). Alternately, the spinning heads can be installed to feed the desired fibers directly to the machine. Providing an array of spinners to generate different fibers has the potential to offer truly integrated fiber capability to wet laid media manufacturing process with adjustability to change furnishes.

Figure 15:
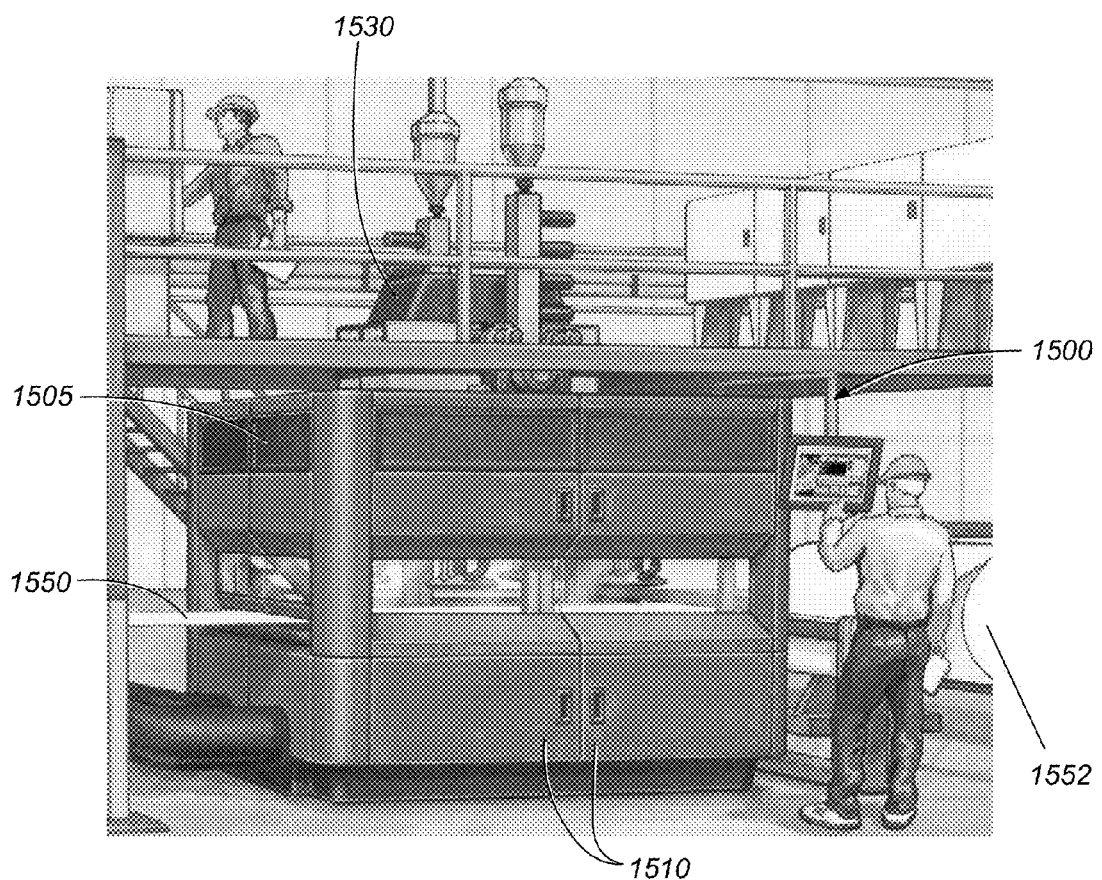
FIG. 15 depicts a perspective view of an embodiment of a modular fiber producing system.

FIG. 15 depicts an embodiment of a system 1500 for producing microfibers and/or nanofibers. The system includes two or more fiber producing modules 1510 coupled to each other to define a single fiber producing system 1500. Fiber producing system 1500 includes material transfer system 1530, which may include a melt device and/or a solution device. A melt device is configured to deliver heated material to one or more of the fiber producing modules. A solution device is configured to deliver material dissolved or suspended in a liquid to one or more of the fiber producing modules. The system includes substrate transfer device 1550 which transfers a substrate through coupled fiber producing modules 1510. Fiber producing system 1500 includes a gas intake 1505. Gas intake may draw ambient air from the surroundings and pass the inputted air into fiber producing modules 1510. In some embodiments, gas intake may be coupled to an inert gas supply. Inert gas may enter the gas intake and be dispersed to the fiber producing modules during processing of oxygen or air sensitive materials. Use of an inert gas may also control the humidity in the modules for water sensitive materials. In some embodiments, it is useful to maintain an elevated temperature in the fiber producing modules. To help maintain a proper operating temperature, intake gases may be heated prior to introduction into the fiber producing device. A heater (not shown) may be coupled to gas intake 1505 to heat gasses that enter fiber producing system 1500

Figure 16:
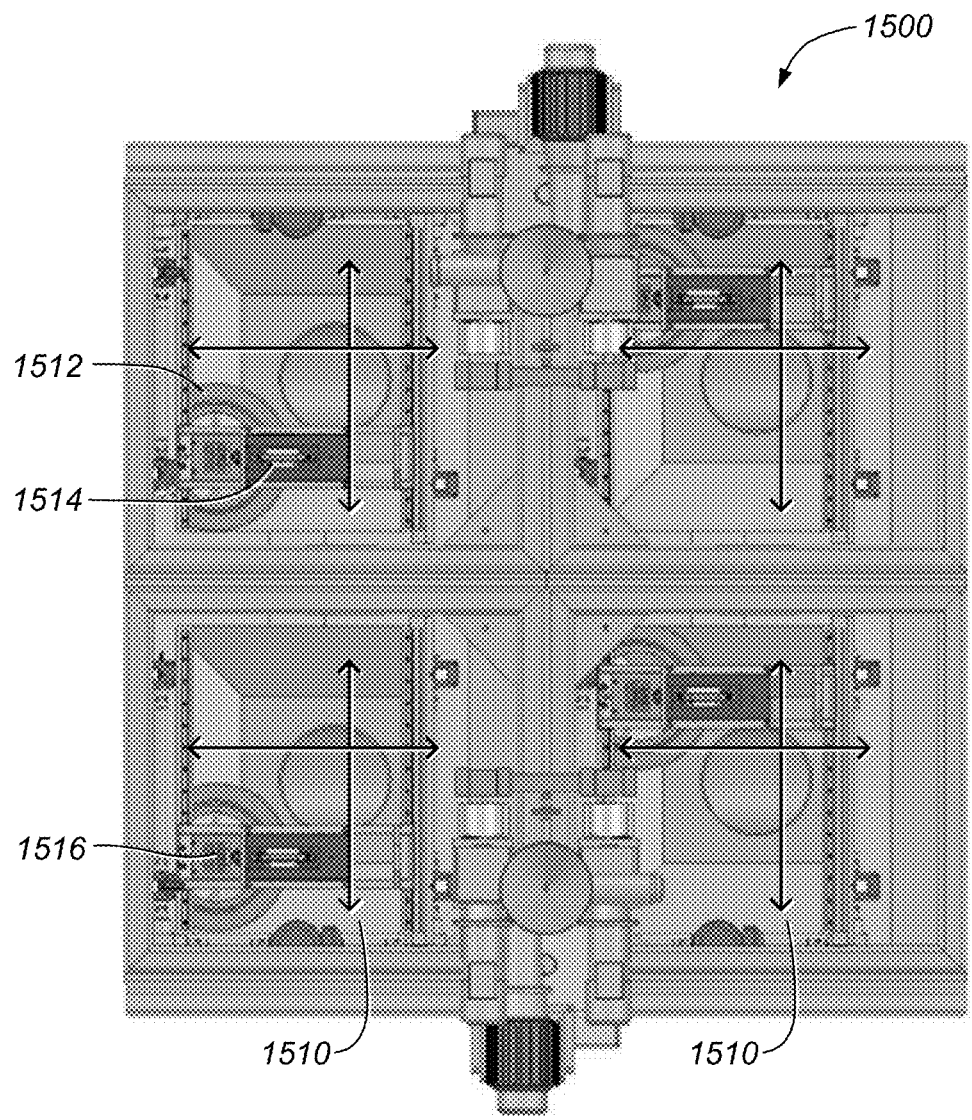
FIG. 16 depicts a top view of a modular fiber producing system.

FIG. 16 depicts a top view of fiber producing system 1500. Fiber producing system 1500 includes four fiber producing modules 1510 coupled to each other. While only four modules are depicted, it should be understood that any number of modules may be coupled together to create customized fiber producing systems. Each module comprises a fiber producing device 1512 coupled to a fiber producing device support 1514. Any fiber producing device, as described herein, may be incorporated into a fiber producing module. Support 1514 is movable within fiber producing module 1510 such that the position of fiber producing device 1512 can be adjusted within module 1510. As shown, the position of fiber producing device 1512 within module 1510 can be adjusted laterally, i.e., along an x-y axis. Furthermore, while not depicted, fiber producing device 1512 may also be adjusted vertically, i.e., along the z-axis, by altering the vertical distance of the fiber producing device with respect to support 1514. In some embodiments, support 1514 allows up to about twenty five inch adjustability along the x-y axis and up to about ten inch adjustability along the z-axis. Support 1514 may also include a driver 1516 capable of rotating fiber producing device 1512.

Figure 17:
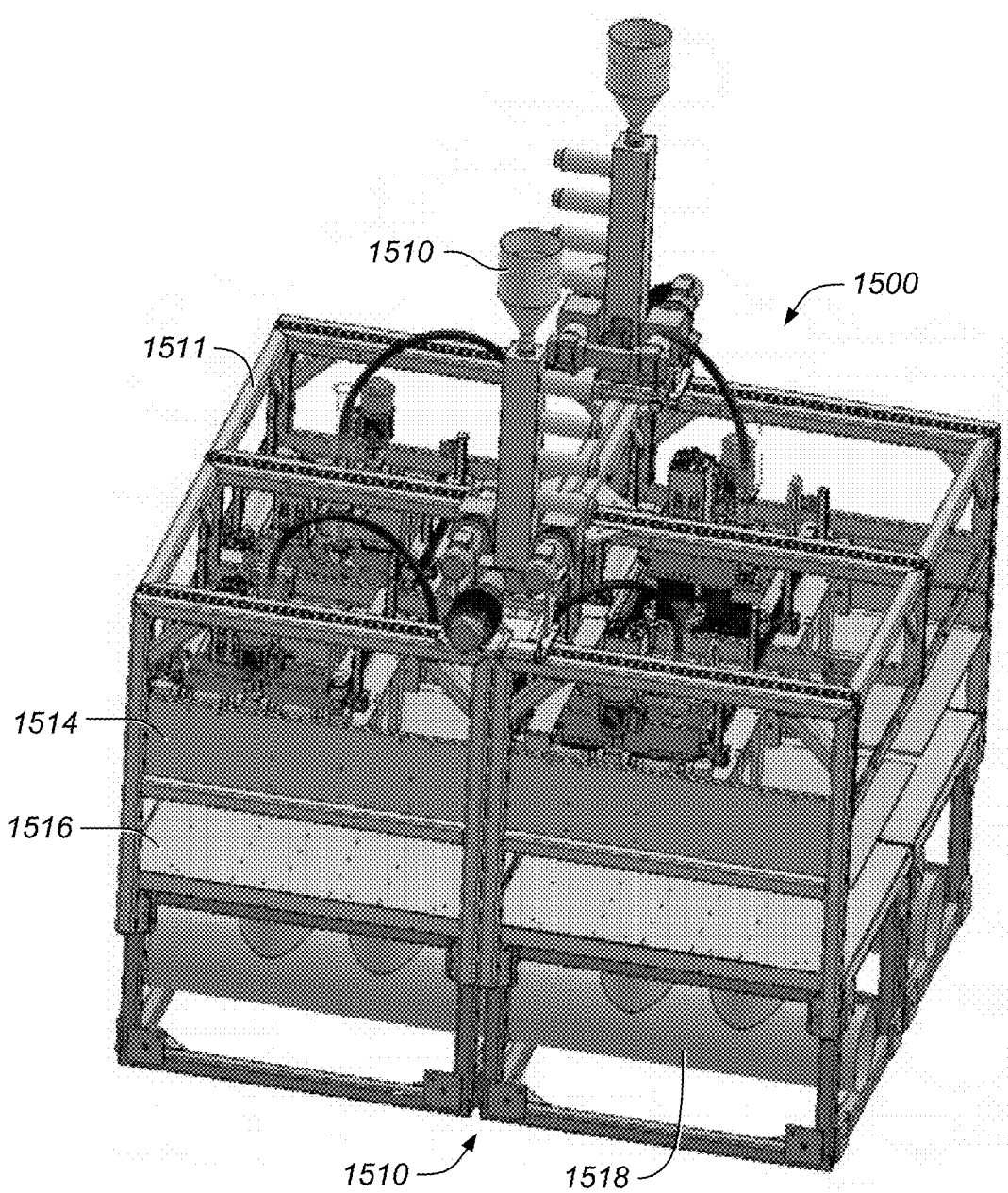
FIG. 17 depicts a cut away perspective view of a modular fiber producing system.

FIG. 17 depicts a projection view of fiber producing modules 1510. Module 1510 may include a fiber producing device support 1514 coupled to fiber producing module body 1511. Module body 1511 may include rails having one or more connection devices (not shown) that allow the modules to be easily coupled to each other. Fiber producing module 1510 may also include a transportation device (not shown) coupled to the module. Transportation device may allow the fiber producing device to be moved toward or away from other fiber producing modules. In an embodiment, transportation device includes one or more wheels that allow fiber producing modules to rolled away from, or toward, other fiber producing modules. Portable fiber producing modules allow users of the system to easily move and rearrange the equipment without the need for moving equipment.

Fiber producing module 1510 may include a substrate platform 1516. During use a substrate may be placed on the substrate platform to receive fibers produced in fiber producing module 1510. When combined to form a fiber producing system, substrate platforms from each of the fiber producing modules may be coupled together to form a substantially continuous single substrate platform. In some embodiments, the substrate is transferred through fiber producing module 1510 along substrate platform 1516. For example, substrate may be a material that is going to be embedded with fibers. The material may be coupled to a substrate transfer system that pulls (or feeds) the substrate along one or more of substrate platforms 1516 of one or more fiber producing modules 1510. Substrate transfer system 1552 (see FIG. 15) may be set up external to the combined fiber producing modules, such that the substrate may be simultaneously passed through each of the fiber producing modules during fiber production. The use of fiber producing modules allows the fiber producing system to be customized to an existing substrate transfer system. For example, for an existing substrate production system, one or more fiber producing modules may be combined so that the formed fiber producing system covers the width of the substrate. Thus, fibers can be introduced into a normal substrate production line with no or minimal changes to an existing substrate production line.

Fiber producing module 1510 may include a gas transfer system that includes a gas transfer conduit 1518 which is coupled to a gas transfer pump (e.g., a fan or blower) which, in combination, are used to create a flow of gas toward and through substrate platform 1516. In an embodiment, substrate platform 1516 may have a plurality of holes through which air is pulled through during use. The resulting suction may help to draw fibers from the fiber producing device toward a substrate disposed on substrate platform 1516. Gas transfer conduit 1518 may be coupled to one or more other gas transfer conduits of other fiber producing modules.

Figure 18:
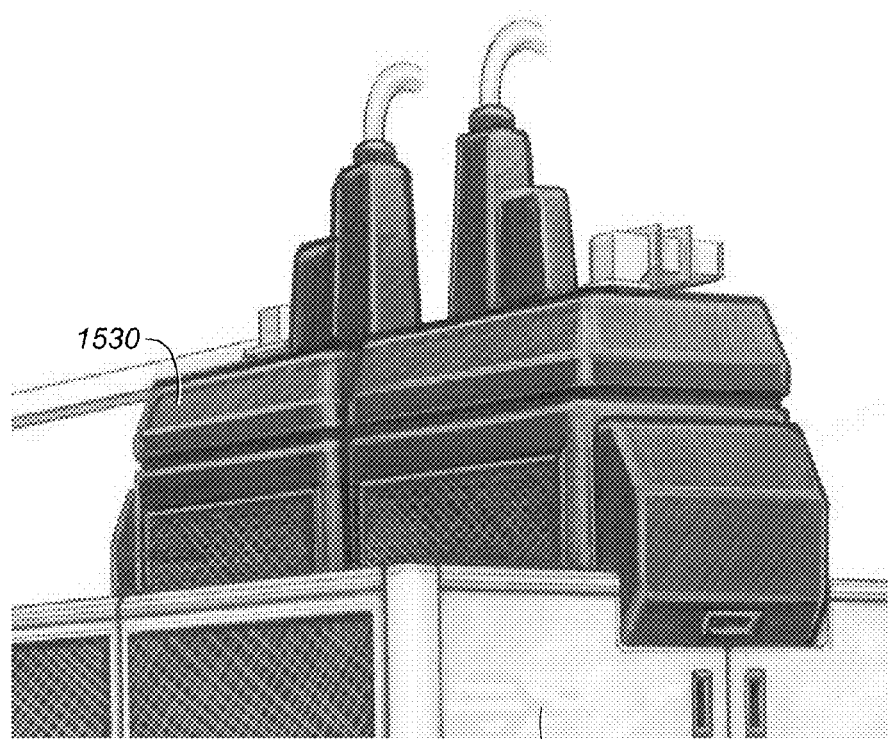
FIG. 18 depicts a perspective view of a material handling module of a fiber producing system.
Figure 19:
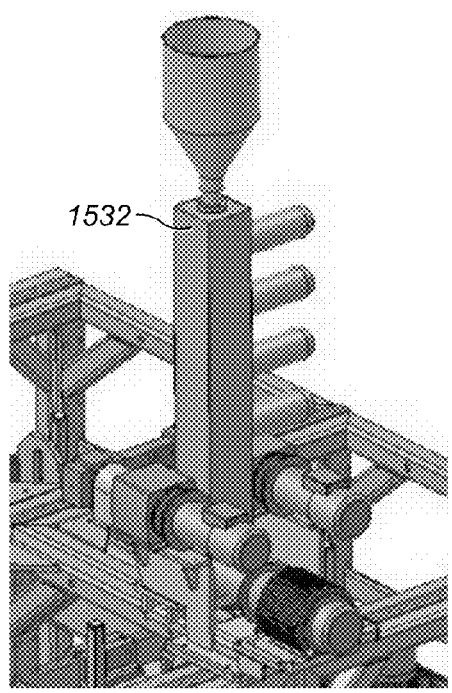
FIG. 19 depicts a perspective view of a hot melt and transfer system.

FIG. 18 depicts a projection view of a material transfer device 1530 coupled to multiple fiber producing modules. Each material transfer device 1530 may be used to transfer material to be spun into fibers to at least one, and in some embodiments, at least two fiber producing modules. In one embodiment, material transfer device 1530 may include a hot melt system. A hot melt system 1532 (depicted in FIG. 19) may be used to produce a melted, or at least partially melted material, and transfer the material to the fiber producing modules in a molten, or partially molten state. In other embodiments, the material transfer device 1530 may include a liquid delivery system that delivers material dissolved or suspended in a liquid to the fiber producing modules. Material transfer device 1530 may include quick disconnect couplings (not shown) which allow the devices to be easily removed and replaced.

A modular fiber producing system (e.g., fiber producing system 1500), may be operated using one or more controller. In one embodiment, a single main controller may be used in conjunction with multiple sub-controllers to control operation of the system. In an embodiment, each module may include a module sub-controller. A module sub-controller may activate and modulate various components within a module. For example, module sub-controller may control components such as IR sensors (for temperature measurements and fluid level measurements), heaters (e.g., heaters that heat the fiber producing device), fans (e.g., fans that direct air through the module), a positioning device (which alters the position of the fiber producing device) and door locks for the module. Material transfer devices may also have a sub-controller. The material transfer sub-controller may control aspects of operation of the material transfer sub-controller such as the heater, melt pump, pressure monitors, and temperature probes. The sub-controllers may be coupled to the main controller directly, wherein the main controller sends command signals to each of the sub-controllers to control operation of the components. In other embodiments, the module sub-controllers may be coupled to the material transfer sub-controller which in turn is coupled to the main controller. In either embodiment, main controller may control the operation of each of the components, for example by sending power on/off signals, operating parameters (such as fiber producing device rotation speed, temperature of fiber producing device, temperature of module, material temperature, material feed rate, position of the fiber producing device), and diagnostic signal checks. Main controller may also detect how many modules are present in the system, as well as the configuration of the modules. Main controller may allow independent operation of each module such that modules may be removed or added to the system without having to stop operation of modules that are operating in the system.

Figure 20:
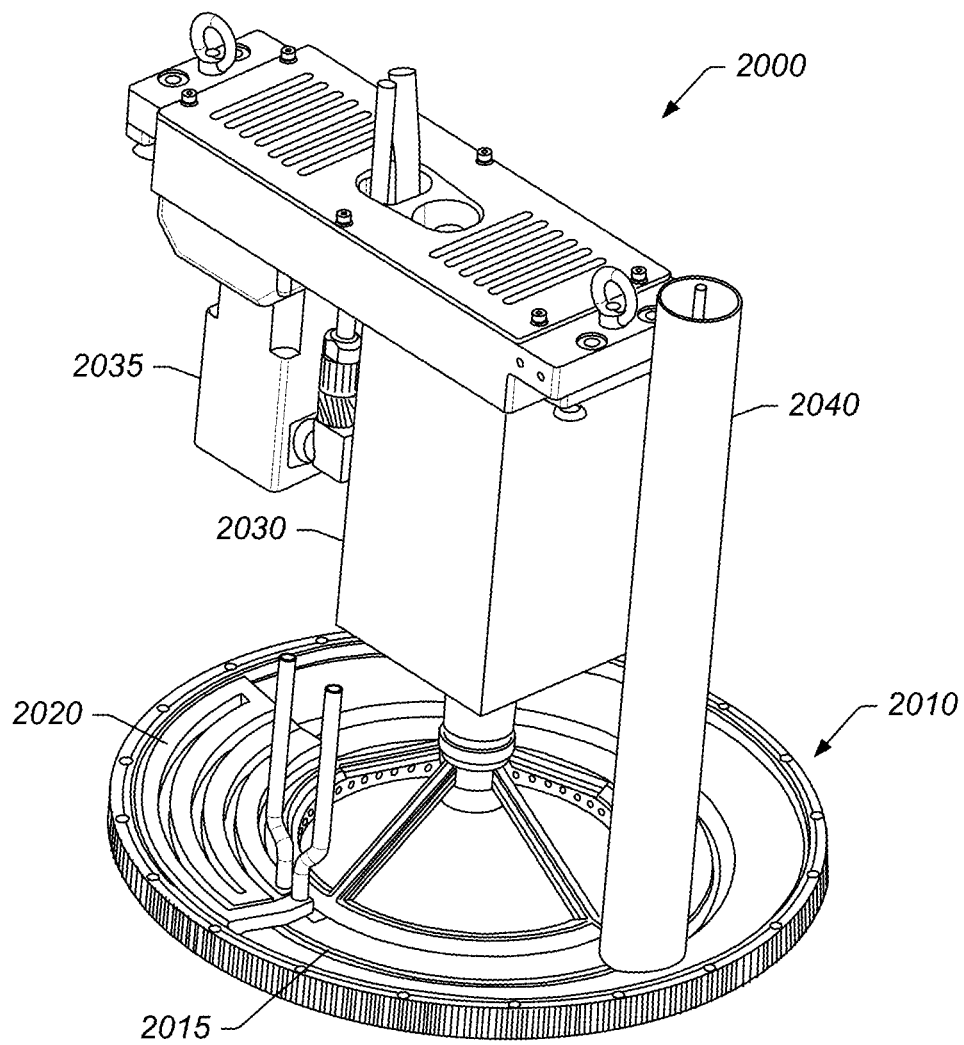
FIG. 20 depicts a perspective view of a fiber producing unit.

Another embodiment of a fiber producing device is depicted in FIG. 20. Fiber producing device 2010 is part of a fiber producing unit 2000 that may be disposed in a fiber producing system or module. Fiber producing unit 2000, in an embodiment, includes a fiber producing device 2010 comprising a body, defining a body cavity, and having a plurality of openings in the body cavity through which material is ejected during rotation of the body. An inductive heater 2020 is positioned proximate to the body of fiber producing device 2010 such that the inductive induces an electrical current in the body of fiber producing device 2010. The body of fiber producing device thereafter becomes heated by the induced electrical current. In some embodiments, inductive heater 2020 is stationary with respect to the body, while the body is being rotated.

Fiber producing unit 2000 also includes a driver 2030, which is capable of rotating the fiber producing body. Driver 2030 is coupled to power supply 2035, which supplies power to the driver and inductive heater 2020.

Fiber producing device 2010 includes a body cavity 2015 which receives material to be used to form fibers (e.g., microfibers and nanofibers). A material transfer conduit 2040 may be used to transfer material to the body cavity. Material transfer conduit 2040 may transfer liquids to the fiber producing device (e.g., liquid suspensions, liquid solutions, and hot materials). In one embodiment, material transfer conduit 2040 may be coupled to a hot melt system (e.g., material transfer device 1530) and may be insulated to allow the transfer of heated material to the fiber producing device without substantial reduction in temperature of the material. For example, material transfer conduit 2040 may be a hot runner conduit. Fiber producing device 2010 includes a plurality of openings through which material is ejected to produce microfibers and/or nanofibers.

Figure 21:
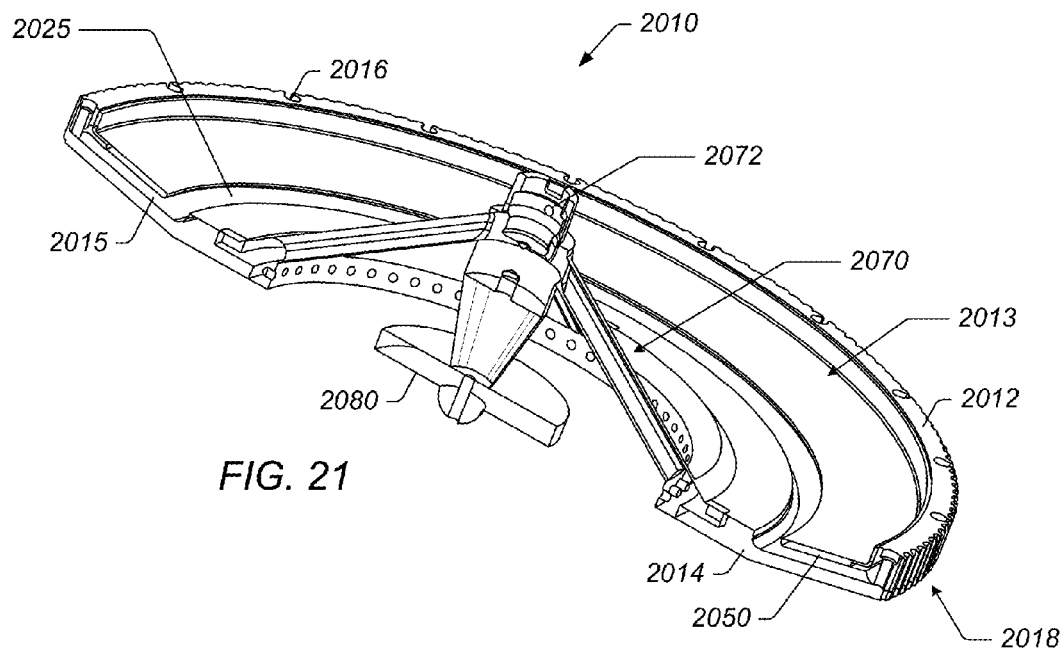
FIG. 21 depicts a perspective view of a fiber producing device.

FIG. 21 depicts a cross-section view of a fiber producing device 2010. Fiber producing device 2010 includes a gear like body 2018, having a plurality of orifices disposed in the groove of each gear like extension. Body 2018 may be composed of a top member 2012 and a bottom member 2014. Top member 2012 may be coupled to bottom member 2014 using fasteners placed in recessed holes 2016. Fasteners may be removable to allow the top member to be separated from the bottom member to allow cleaning of the fiber producing device. Top member 2012 and bottom member 2014 together define body cavity 2015, in which the material to be formed into fibers is disposed. An opening 2025 (e.g., in the form of a channel) extends through top member 2012 to body cavity 2215 to allow material to be placed into body cavity. Use of a channel that couples directly to the body cavity allows introduction of the material from the top face of the body while the body is being rotated.

Figure 23:
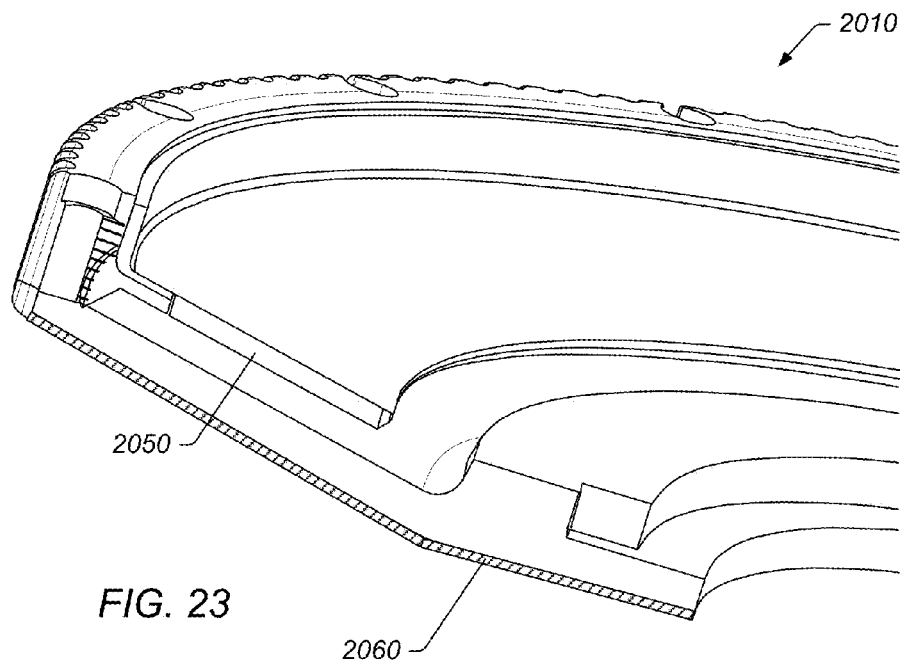
FIG. 23 depicts an expanded cross-section view of the body of a fiber producing device.
Figure 24:
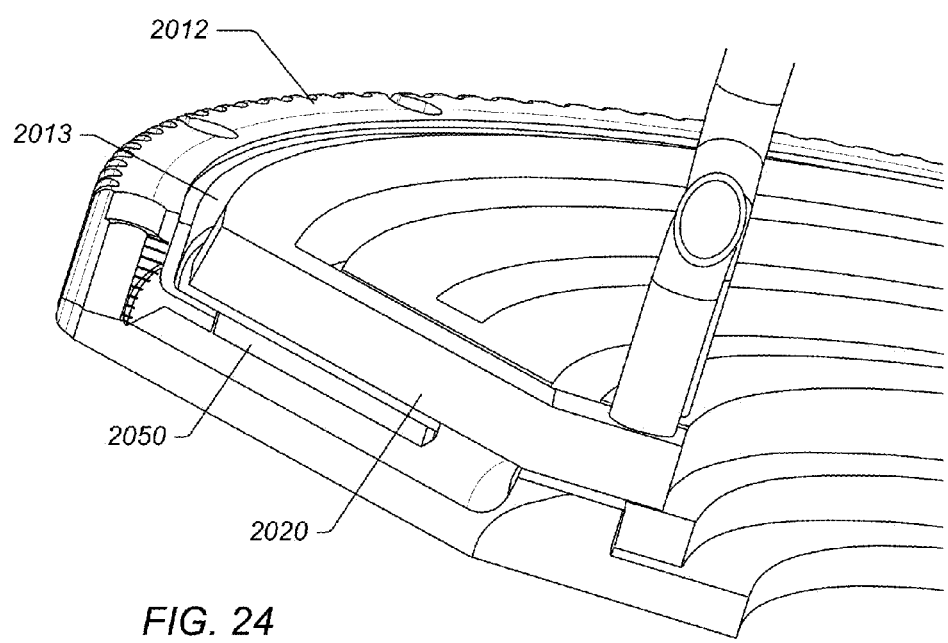
FIG. 24 depicts a cross-section view of the fiber producing unit of FIG. 15.

In some embodiments, a shield 2050 is disposed on top member 2012. FIG. 23 is an expanded cross sectional view of the fiber producing device 2010. Shield 2050 is positioned such that the shield at least partially surrounds inductive heater coil 2020, positioned proximate to the fiber producing device during use. Shield 2050, in one embodiment, is shaped to cover the bottom of an inductive heating coil and the outer perimeter of the coil. Shield 2050 may be formed from any material that is inductive frequency transparent and capable of withstanding the high temperature used, for example, during melt processing. An example of a shield material is TenCate Ultra high temp RS-55 resin. Other polymeric material may be used. Shield 2050 is rapidly heated by the fiber producing device and serves as a barrier to inhibit material from collecting and accumulating on the cooler inductive coil. In an embodiment an insulating layer 2060, depicted in FIG. 23, is disposed on a bottom exterior surface of the fiber producing device. Insulating layer 2060 reduces heat loss from the body of the fiber producing device (when heated) and improves thermal uniformity of the material disposed within the body cavity.

Figure 22:
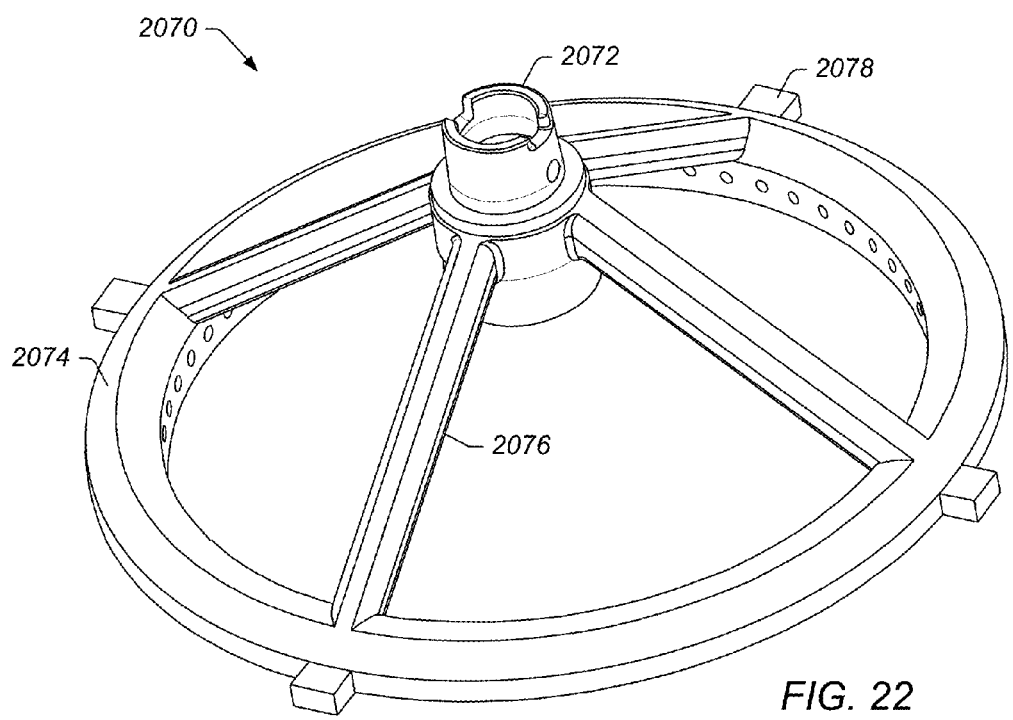
FIG. 22 depicts a perspective view of a coupling member.

Fiber producing device 2010 is coupled to a drive using coupling member 2070. An embodiment of coupling member 2070 is depicted in FIG. 22. Coupling member, in some embodiments, has an open hub design. An open hub design features a central coupler 2072 which is connected to a coupling ring 2074 through one or more arms 2076, leaving a substantially empty area between the central coupler and the coupling ring. Coupling ring 2074 may include one or more coupling tabs 2078, which interlock with corresponding features on fiber producing device body 2010 to removably couple the coupling member to the fiber producing body, as depicted in FIG. 21. This open hub design helps improve air flow management around the fiber producing device.

In some embodiments, it is desirable to control the flow of fibers being produced from the fiber producing device. For example, it may be desirable to direct fibers toward a substrate disposed below the fiber producing device. In some embodiment, a fan 2080 may be coupled to the coupling member, as depicted in FIG. 9. Fan 2080 may create a flow of gas in a downward direction, away from the fiber producing device when the fiber producing device is rotated. In some embodiments, fan 2080 is removably coupled to coupling member such that the fan may be changed to accommodate the processing parameters of the system.

Figure 25:
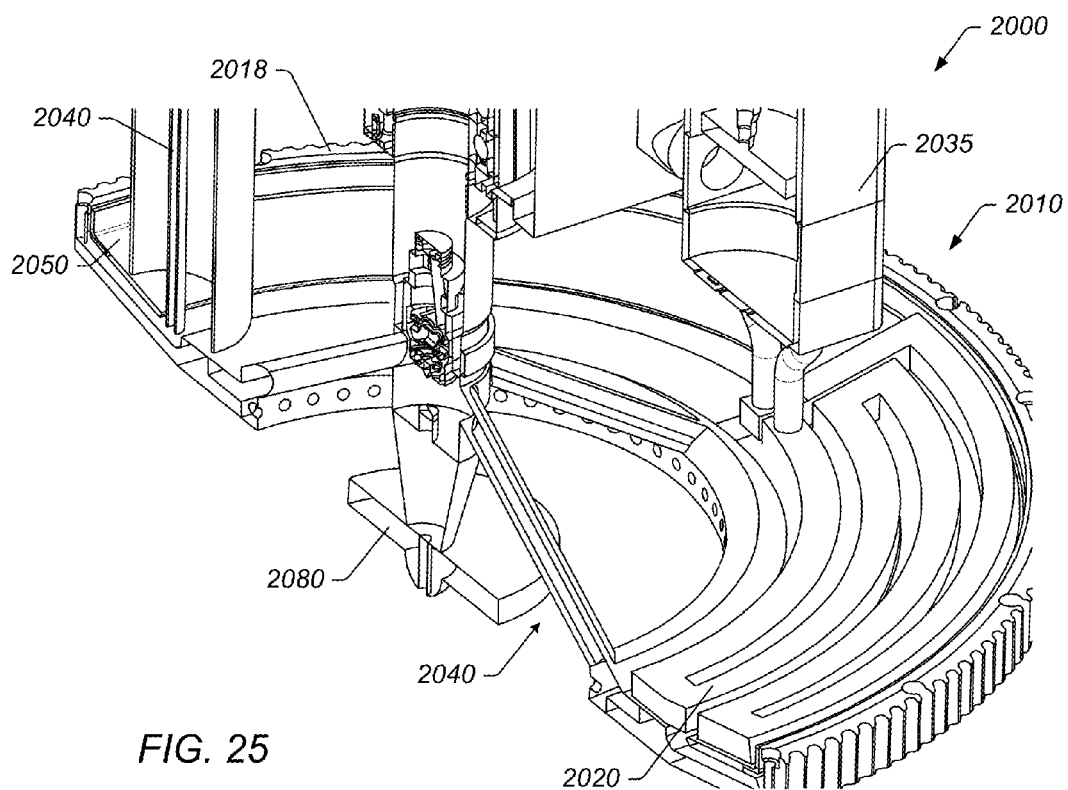
FIG. 25 depicts an expanded cross-section view of the body of a fiber producing device, with a proximate inductive heating coil.

FIG. 25 depicts a cross-sectional view of an assembled fiber producing unit 2000. The fiber producing unit includes a fiber producing device 2010, which includes body 2018, coupling member 2070 and fan 2080. Fiber producing unit 2000 also includes inductive heating coil 2020, power supply 2035 for the inductive heating coil, and a material transfer conduit 2040. Material transfer conduit is coupled to a material transfer device (not shown) which supplies material to the fiber producing device.

FIG. 13 depicts an expanded view of fiber producing unit 2000 of FIG. 20. Inductive heating coil 2020, in one embodiment is positioned within the confines of a channel 2013 defined along the upper surface of top member 2012 of the body. As discussed above, a shield 2050 is an inductive frequency transparent and serves as barrier that inhibits the deposition of material onto inductive heating coil 2020. Channel 2013, better seen in FIG. 21, has a shape that is complementary to the outer shape of inductive heating coil 2020. When assembled, inductive heating coil 2020 fits within channel 2013 without touching any surface of the channel. Inductive coil 2020 is at least partially encompassed by channel 2013. During use, inductive heating coil 2020 is disposed, at least partially, within channel 2013 in a stationary position with respect to the fiber producing device body. Thus, when rotated, fiber producing device 2010 spins about the inductive heating coil 2020 without contacting the inductive heating coil. Channel 2013 allows the inductive heating coil to be placed proximate to the fiber producing device body to induce a current in the body, creating heat.

An inductive heating system heats the fiber producing body, which is formed from an electrically conducting material (e.g., a stainless steel) by electromagnetic induction. Electromagnetic induction creates eddy currents (also called Foucault currents) within the fiber producing device body. Resistance of the fiber producing body to the induced current leads to Joule heating of the metal. The inductive heating system includes an inductive heating coil 2020, through which a high-frequency alternating current (AC) is passed. The amount of heat generated in the fiber producing body is controlled by varying the inductive current induced in the fiber producing device body. In some embodiments, the shape or material used to form the fiber producing body may be adjusted to modify the induced current flow through the body. The shape of the body may therefore produce a homogenous distribution of current through the body to produce more homogenous heating of the body.

In another embodiment, an inductive heating system includes oppositely polarized magnets positioned on a surface of a fiber producing device body, and a permanent magnet magnetically coupled to the permanent magnets. During rotation of the fiber producing device, a current is induced in the body by the interaction of the polarized magnets positioned on the fiber producing device with the permanent magnets.

Figure 26:
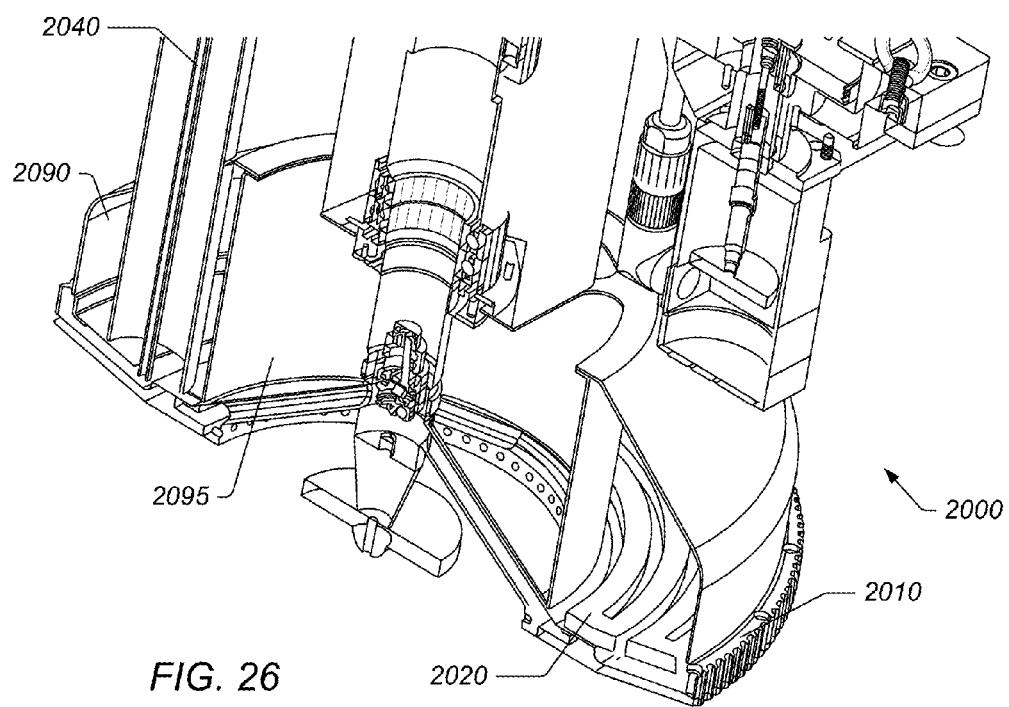
FIG. 26 depicts a cross-section view of a sealed fiber producing unit.

FIG. 26 depicts an embodiment of a sealed fiber producing unit 2000. Sealed fiber producing unit includes a fiber producing device 2010, inductive heater 2020, and material transfer conduit 2040, as well as other components as previously described. Sealed fiber producing device further includes sealing members 2090 and 2095 which form a seal which inhibits atmospheric gasses from entering the body cavity of the fiber producing device. Seal may include cut-out portions that allow inductive heater 2020 and material transfer conduit 2040 access to the fiber producing device. In some embodiments, seal is not necessarily "airtight". In such a system, the material in the fiber producing body may be protected from atmospheric gasses by creating a positive pressure of inert gas within the sealed region defined by the sealing members. Inert gases include, but are not limited to gases such as nitrogen, helium and argon. The sealing members also help to inhibit heat loss from the fiber producing unit components. For example, the presence of sealing members may inhibit cooling of the fiber producing device due to heat transfer through atmospheric gasses.

Figure 27:
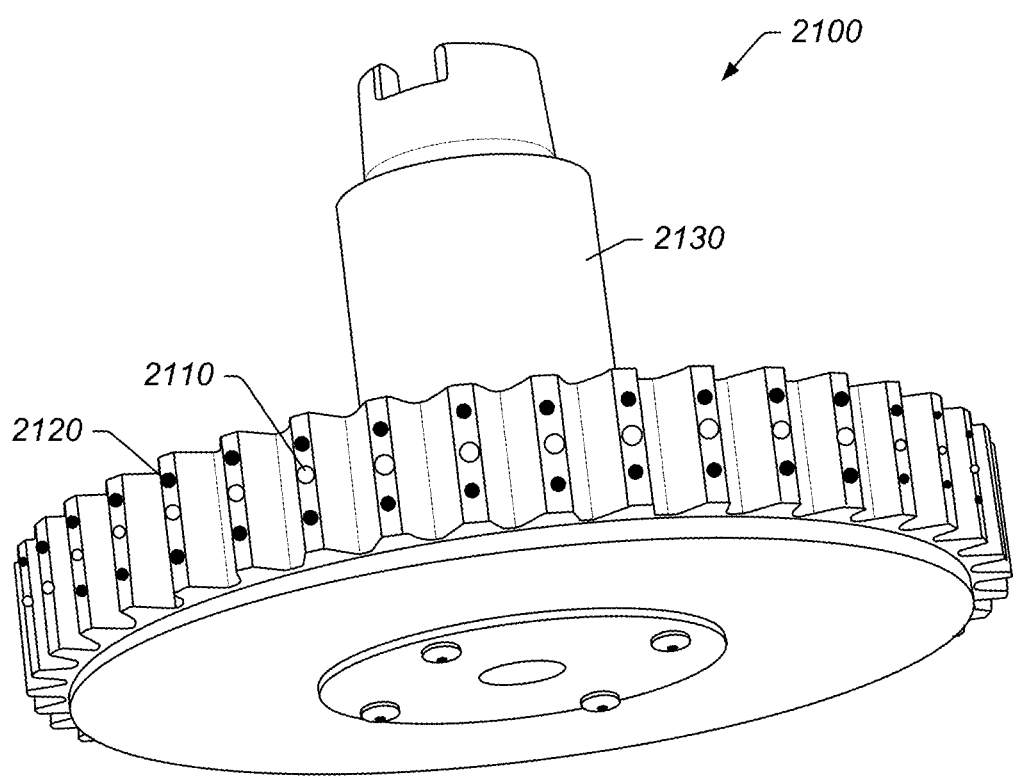
FIG. 27 depicts a perspective view of a fiber producing device comprising openings and gas outlets.

In another embodiment, a fiber producing device includes a body having one or more material outlets, an internal body cavity, and a coupling member. The internal cavity is configured to receive material to be produced into a fiber. In some embodiments the body further comprising one or more gas outlets positioned proximate to one or more material outlets. During use, rotation of the body causes material in the body cavity to be passed through one or more material outlets and ejected to produce microfibers and/or nanofibers, and wherein during rotation of the body, gas is passed through the gas outlets. An embodiment of a fiber producing device having such a configuration is depicted in FIG. 27. Fiber producing device 2100, includes one or more material outlets 2110 passing through the sidewalls of the body and one or more gas outlets 2120 positioned proximate to one or more material outlets. During use, gas is ejected through one or more of the gas outlets 2120, while material is ejected through one or more of the material outlets 2110. The ejected gas can guide the ejected material away from the fiber producing device to assist with the formation of fibers.

Figure 28:
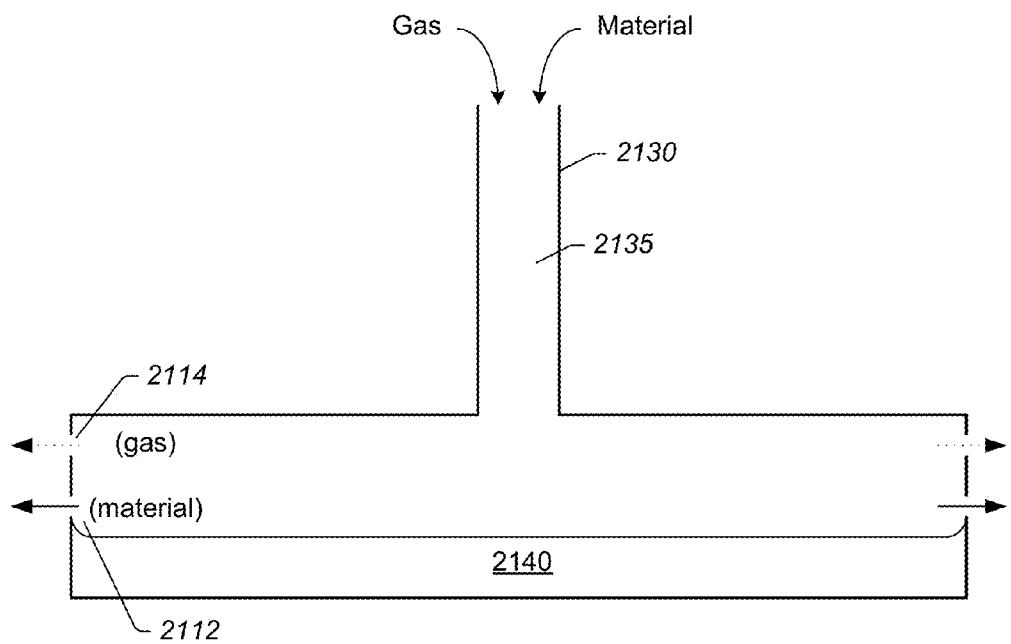
FIG. 28 depicts a schematic view of a fiber producing device having a combined gas and material inlet.
Figure 29:
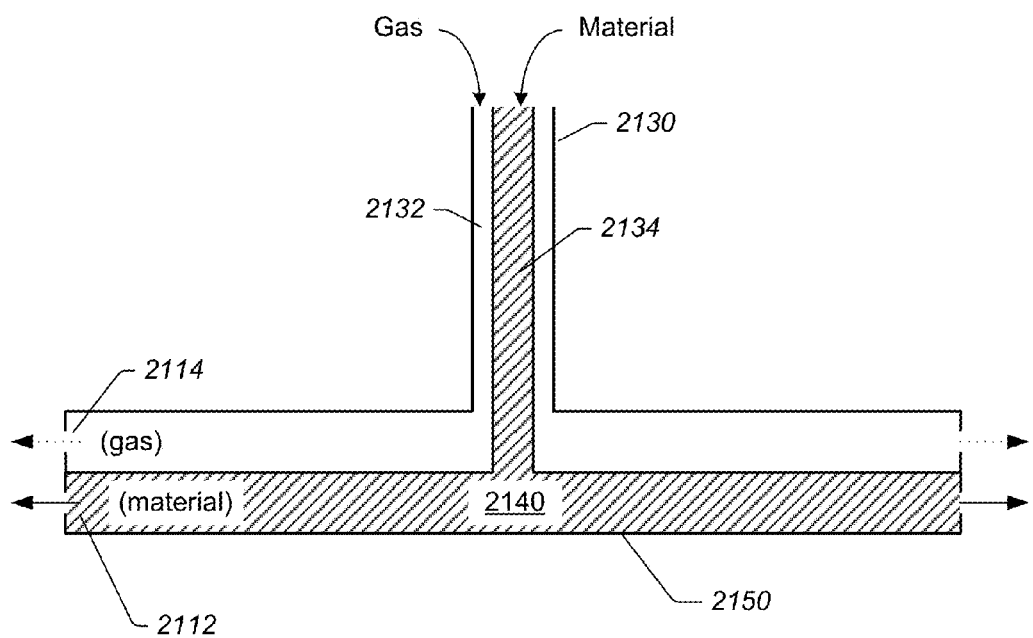
FIG. 29 depicts a schematic view of a fiber producing device having separate gas and material inlets.

Fiber producing device 2100 includes a coupling member 2130 which couples the fiber producing device to a driver. Coupling member 2130 may include a central conduit 2135 which extends through the coupling member into the body of fiber producing device 2110, as depicted in FIG. 28.

Central conduit may be used to introduce material and gas directly into the body of fiber producing device 2100. In this embodiment, the material 2140 is deposited on the bottom of the fiber producing device. During use, when fiber producing device is rotated, material 2140 rises toward material outlets 2110 due to centrifugal forces. In addition, gas in the fiber producing device internal cavity, is ejected through one or more gas outlets 2120. The gas is ejected as a flow of gas away from fiber producing device. Fibers produced by the fiber producing device are carried away from the fiber producing device by the gas flow. In the embodiment depicted in FIG. 28, gas outlet 2120 is positioned above material outlet 2110, however, any suitable orientation of gas outlets and material outlets may be used.

In some embodiments, central conduit 2130 may include a material delivery conduit 2134 and a gas delivery conduit 2132. Material delivery conduit 2134 may be used to introduce material into the body to be converted to fibers. Gas delivery conduit 2132 may be used to pass gas into the fiber producing device. Gas delivery conduit 2132 is coupled to a portion of the fiber producing device such that gas passes into the fiber producing device and out through gas outlets 2114, while being inhibited from entering the internal cavity 2150 which holds the material. Material delivery conduit 2134, in a similar manner, may be coupled to the fiber producing device such that material passes into internal cavity 2150. In applications that use a heated material for fiber production, gas entering the fiber producing device may be heated such that heated gas, preferably at or near the temperature of the heated material, is ejected from the fiber producing device.

As depicted in FIG. 27, fiber producing device 2100 may be gear shaped, having a plurality of teeth which extend from a substantially circular central body. For a gear shaped fiber producing device material outlets may be positioned at the end of the teeth or in the gap between the teeth. In an embodiment, the material outlets are positioned at the end of each tooth of the gear shaped fiber producing device. Each tooth that includes a material outlet will also have a first internal channel that couples the internal cavity of the body to one or more material outlets and a second internal channel coupling one or more gas outlets to a gas source.

Figure 30:
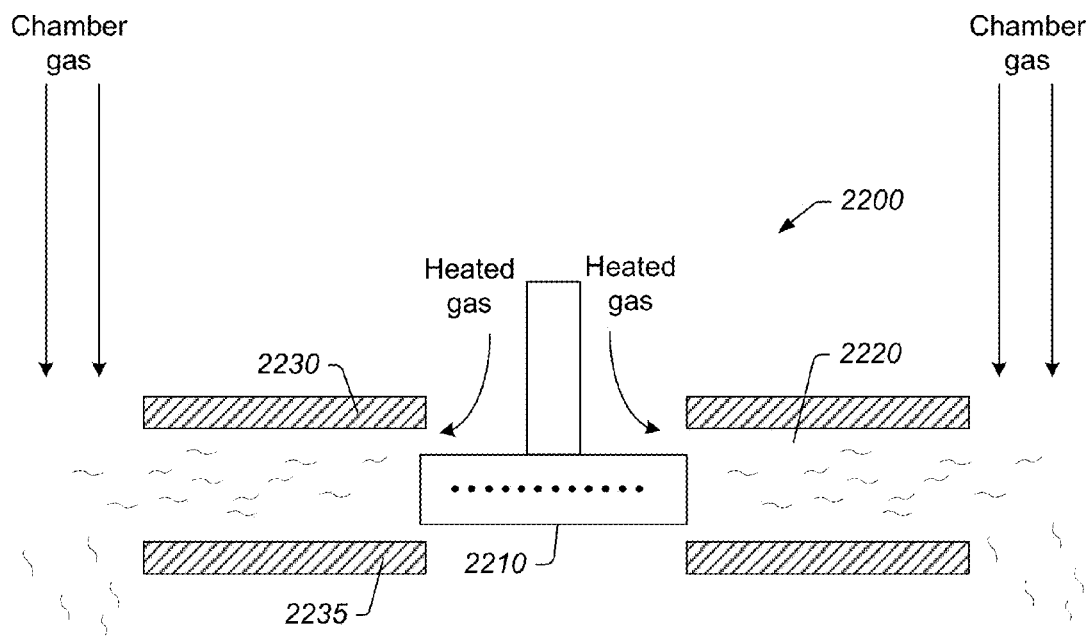
FIG. 30 depicts a cross-section schematic diagram of a fiber producing system that includes a micro-climate control chamber at least partially surrounding the fiber producing device.

In some embodiments, it may be useful for the material being converted into fibers to remain in a liquid state as long as possible. This allows the material to continue to lengthen and stretch after the material has left the fiber producing device. In an embodiment, depicted in FIG. 30, a fiber producing system 2200 includes a fiber producing device 2210 and a micro-climate chamber 2220. Micro-climate chamber comprises a top member 2230 and a bottom member 2235, which together define a chamber cavity through which the fibers are carried after production. In an embodiment, top member 2230 and bottom member 2235 are positioned above and below openings of the fiber producing device to create a chamber having a channel that is substantially aligned with the openings of fiber producing device 2210. Top member and bottom member may be disk shaped, forming a circular chamber that surrounds fiber producing device 2210.

In an embodiment, heated gas (e.g., air or an inert gas) may be directed into the interface between fiber producing device 2210 and micro-climate chamber 2220, as shown in FIG. 73. The heated gas forms a high temperature region within micro-climate chamber 2220. Additional heated gas may be introduced into micro-climate chamber 2220 through the top member and/or bottom member at other radial positions within the chamber. Heated gas may be used to control the temperature within micro-climate chamber 2220 and to assist with moving the fiber through the chamber. In some embodiments, a laminar flow of gas (either heated or not heated) is created within micro-climate chamber 2220 to keep the growing fibers from tangling with each other, and to also inhibit contact of the fibers with the micro-climate chamber walls. Additionally, chamber gases may be used to direct the produced fibers away from the micro-climate chamber after the fibers leave the chamber. The chamber gas may be heated, or may provide cooling to help solidify the fibers. The chamber gas may also be used to direct the fibers toward a substrate disposed proximate to micro-climate chamber 2220.

In an embodiment, one or both of top member 2230 and bottom member 2235 may be heating elements (e.g., a resistive heating element). Using a heating element as top member 2230 and/or bottom member 2235 allows the temperature of the environment of the micro-climate chamber to be more accurately controlled. In another embodiment, top member 2230 and bottom member 2235 may act as an electric field generator. The electric field generator is positioned such that an electric field produced by the electric field generator does not aid in fiber formation. An electric field generator produces an electric field that inhibits agglomeration and/or entwining of the produced microfibers and/or nanofibers. In an embodiment, top member 2230 and bottom member 2235 are oppositely charged plates. The electric field may be above 10 KV/m.

It has been found that, in some instances, the fibers tend to agglomerate and become entwined with each other as they are ejected from a rotating fiber producing device. This agglomeration can lead to undesirable properties of the produced fibers for some applications. Agglomeration and/or entwining of the produced fibers may be inhibited by the application of an electric field to the fibers. In one embodiment, an electric field is created proximate to the fiber producing device. Unlike the electric field used in electrospinning processes, the created electric field is in a position that is not used to create the fibers. Instead, the electric field is positioned in the collection region of the apparatus, such that the fibers enter the electric field after they are produced. The electric field charges the produced fibers to inhibit agglomeration and/or entwining of the fibers. In some embodiments, the electric field may be positioned within a collection system to inhibit agglomeration and/or entwining of the fibers. The produced fibers, in this embodiment, travel toward the collection system and, when they reach the collection system become charged by the electric field to inhibit agglomeration and/or entwining.

In some embodiments, corona discharge technology may be used to create an electrostatic charge in the formed fibers. A device producing a corona discharge is placed proximate to a fiber producing device, such that the produced fibers enter the corona discharge field. The fibers entering this field become charged (either positively or negatively, depending on the type of corona discharge used). The charged fibers are attracted to a charged substrate or a charged plate positioned below the fiber producing device. The use of electrostatic charges helps improve the uniformity of fibers used to coat a substrate. The corona discharge field used in this embodiment is placed in a position that is not used to influence the creation of the fibers. Instead, the corona discharge field is positioned in the collection region of the apparatus, such that the fibers enter the corona discharge field after they are produced.

In another embodiment, the electric field is created within the fiber producing device. The electric field will impart electrical charges to the formed fibers, thus inhibiting agglomeration and/or entwining of the fibers. In other embodiments, the material used to form the fibers may be charged prior to fiber formation (e.g., by the addition of charged surfactants). The chemically charged fibers will naturally repel each other, leading to reduced agglomeration and/or entwining. In some embodiments, a combination of chemically charged fibers and electric fields may be used to inhibit agglomeration and/or entwining. In an alternate embodiment, fiber may be charged by using an alpha particle emitter. An alpha particle emitter (e.g., a $^{210}$Po emitter) may be placed in the exit path of the fibers, sending alpha particles toward the emitted fibers. The alpha particles induce charges in the produced fibers, inhibiting agglomeration and/or entwining.

Fibers may be charged (either positively or negatively, using any of the methods set forth above. The charged fibers are attracted to a charged substrate or a charged plate positioned below the fiber producing device. In one embodiment, a charged plate is placed under a non-charged substrate. The charged fibers are attracted to the charged plate, but become entrained within the substrate positioned above the charged plate. In an alternate embodiment, the substrate may be charged. For example, the substrate may be metal which is coupled to an electric source which creates a charge in the substrate. Alternatively, the substrate may be placed in an electric field or corona discharge field to impart a charge directly to the substrate. In this manner, the charged fibers will be attracted to the charged substrate directly, without the need for a charged plate.

Figure 31:
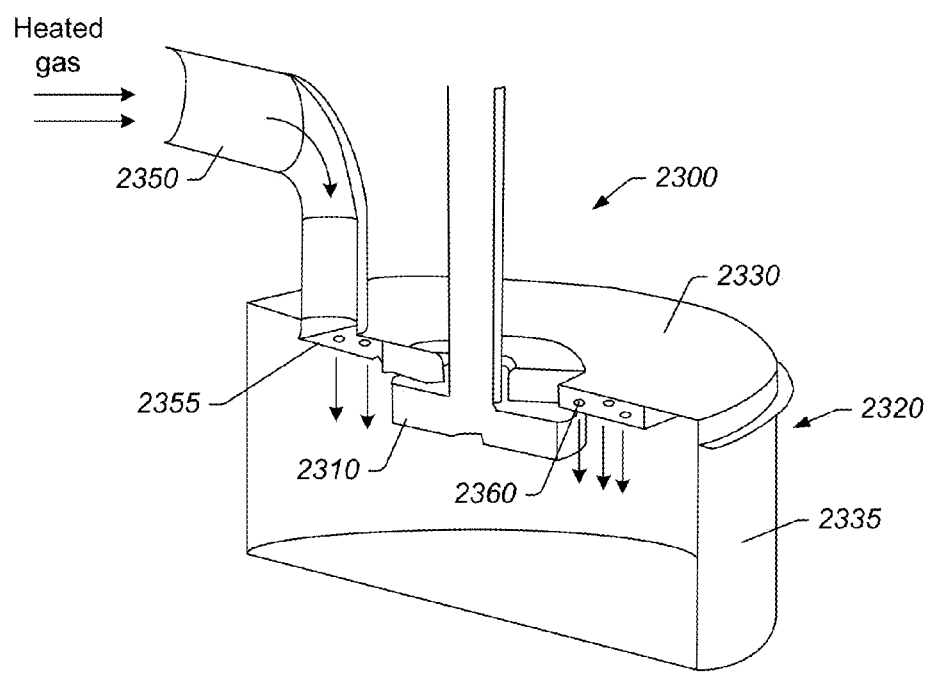
FIG. 31 depicts a projection view of a fiber producing system that includes a sealed micro-climate control chamber surrounding the fiber producing device.

In another embodiment, depicted in FIG. 31, fiber producing system 2300 includes a fiber producing device 2310 and a substantially sealed chamber 2320. Chamber 2320 includes a top 2330 and sidewalls 2335, which together define a chamber cavity into which the fibers enter when formed. Fiber producing system 2300 also includes a gas intake conduit 2350 coupled to a gas distribution conduit 2355. Gas distribution conduit 2355 includes one or more gas outlets 2360 that allow gas to pass into the chamber 2320.

In an embodiment, heated gas may be directed into chamber 2320, as shown in FIG. 31. The heated gas forms a high temperature region within chamber 2320. The heated gas is directed downward through the openings, moving the formed fibers toward the lower part of the chamber. Sidewalls 2335 inhibit the heated gas from escaping, creating a local region of heated gas around fiber producing device 2310. Fibers produced by fiber producing device 2310 encounter the heated gas, slowing the cooling rate. By slowing the cooling rate of the produced fibers, the fibers will grow longer before solidifying. This generally results in thinner fibers.

Fibers represent a class of materials that are continuous filaments or that are in discrete elongated pieces, similar to lengths of thread. Fibers are of great importance in the biology of both plants and animals, e.g., for holding tissues together. Human uses for fibers are diverse. For example, fibers may be spun into filaments, thread, string, or rope. Fibers may also be used as a component of composite materials. Fibers may also be matted into sheets to make products such as paper or felt. Fibers are often used in the manufacture of other materials.

Fibers as discussed herein may be created using, for example, a solution spinning method or a melt spinning method. In both the melt and solution spinning methods, a material may be put into a fiber producing device which is spun at various speeds until fibers of appropriate dimensions are made. The material may be formed, for example, by melting a solute or may be a solution formed by dissolving a mixture of a solute and a solvent. Any solution or melt familiar to those of ordinary skill in the art may be employed. For solution spinning, a material may be designed to achieve a desired viscosity, or a surfactant may be added to improve flow, or a plasticizer may be added to soften a rigid fiber. In melt spinning, solid particles may comprise, for example, a metal or a polymer, wherein polymer additives may be combined with the latter. Certain materials may be added for alloying purposes (e.g., metals) or adding value (such as antioxidant or colorant properties) to the desired fibers.

Non-limiting examples of reagents that may be melted, or dissolved or combined with a solvent to form a material for melt or solution spinning methods include polyolefin, polyacetal, polyamide, polyester, cellulose ether and ester (e.g., cellulose acetate, cellulose diacetate, cellulose triacetate, etc.), polyalkylene sulfide, polyarylene oxide, polysulfone, modified polysulfone polymers and mixtures thereof. Non-limiting examples of solvents that may be used include oils, lipids and organic solvents such as DMSO, toluene and alcohols. Water, such as de-ionized water, may also be used as a solvent. For safety purposes, non-flammable solvents are preferred.

In either the solution or melt spinning method, as the material is ejected from the spinning fiber producing device, thin jets of the material are simultaneously stretched and dried or stretched and cooled in the surrounding environment. Interactions between the material and the environment at a high strain rate (due to stretching) leads to solidification of the material into fibers, which may be accompanied by evaporation of solvent. By manipulating the temperature and strain rate, the viscosity of the material may be controlled to manipulate the size and morphology of the fibers that are created. A wide variety of fibers may be created using the present methods, including novel fibers such as polypropylene (PP) nanofibers. Non-limiting examples of fibers made using the melt spinning method include polypropylene, acrylonitrile butadiene styrene (ABS) and nylon. Non-limiting examples of fibers made using the solution spinning method include polyethylene oxide (PEO) and beta-lactams.

The creation of fibers may be done in batch modes or in continuous modes. In the latter case, material can fed continuously into the fiber producing device and the process can be continued over days (e.g., 1-7 days) and even weeks (e.g., 1-4 weeks).

The methods discussed herein may be used to create, for example, nanocomposites and functionally graded materials that can be used for fields as diverse as, for example, drug delivery and ultrafiltration (such as electrets). Metallic and ceramic nanofibers, for example, may be manufactured by controlling various parameters, such as material selection and temperature. At a minimum, the methods and apparatuses discussed herein may find application in any industry that utilizes micro- to nano-sized fibers and/or micro- to nano-sized composites. Such industries include, but are not limited to, material engineering, mechanical engineering, military/defense industries, biotechnology, medical devices, tissue engineering industries, food engineering, drug delivery, electrical industries, or in ultrafiltration and/or microelectric mechanical systems (MEMS).

Some embodiments of a fiber producing device may be used for melt and/or solution processes. Some embodiments of a fiber producing device may be used for making organic and/or inorganic fibers. With appropriate manipulation of the environment and process, it is possible to form fibers of various configurations, such as continuous, discontinuous, mat, random fibers, unidirectional fibers, woven and non-woven, as well as fiber shapes, such as circular, elliptical and rectangular (e.g., ribbon). Other shapes are also possible. The produced fibers may be single lumen or multi-lumen.

By controlling the process parameters, fibers can be made in micron, sub-micron and nano-sizes, and combinations thereof. In general, the fibers created will have a relatively narrow distribution of fiber diameters. Some variation in diameter and cross-sectional configuration may occur along the length of individual fibers and between fibers.

Generally speaking, a fiber producing device helps control various properties of the fibers, such as the cross-sectional shape and diameter size of the fibers. More particularly, the speed and temperature of a fiber producing device, as well as the cross-sectional shape, diameter size and angle of the outlets in a fiber producing device, all may help control the cross-sectional shape and diameter size of the fibers. Lengths of fibers produced may also be influenced by the choice of fiber producing device used.

The temperature of the fiber producing device may influence fiber properties, in certain embodiments. Both resistance and inductance heaters may be used as heat sources to heat a fiber producing device. In certain embodiments, the fiber producing device is thermally coupled to a heat source that may be used to adjust the temperature of the fiber producing device before spinning, during spinning, or both before spinning and during spinning. In some embodiments, the fiber producing device is cooled. For example, a fiber producing device may be thermally coupled to a cooling source that can be used to adjust the temperature of the fiber producing device before spinning, during spinning, or before and during spinning Temperatures of a fiber producing device may range widely. For example, a fiber producing device may be cooled to as low as −20 C or heated to as high as 2500 C. Temperatures below and above these exemplary values are also possible. In certain embodiments, the temperature of a fiber producing device before and/or during spinning is between about 4° C. and about 400° C. The temperature of a fiber producing device may be measured by using, for example, an infrared thermometer or a thermocouple.

The speed at which a fiber producing device is spun may also influence fiber properties. The speed of the fiber producing device may be fixed while the fiber producing device is spinning, or may be adjusted while the fiber producing device is spinning Those fiber producing devices whose speed may be adjusted may, in certain embodiments, be characterized as variable speed fiber producing devices. In the methods described herein, the fiber producing device may be spun at a speed of about 500 RPM to about 25,000 RPM, or any range derivable therein. In certain embodiments, the fiber producing device is spun at a speed of no more than about 50,000 RPM, about 45,000 RPM, about 40,000 RPM, about 35,000 RPM, about 30,000 RPM, about 25,000 RPM, about 20,000 RPM, about 15,000 RPM, about 10,000 RPM, about 5,000 RPM, or about 1,000 RPM. In certain embodiments, the fiber producing device is rotated at a rate of about 5,000 RPM to about 25,000 RPM.

In an embodiment, a method of creating fibers, such as microfibers and/or nanofibers, includes: heating a material; placing the material in a heated fiber producing device; and, after placing the heated material in the heated fiber producing device, rotating the fiber producing device to eject material to create nanofibers from the material. In some embodiments, the fibers may be microfibers and/or nanofibers. A heated fiber producing device is a structure that has a temperature that is greater than ambient temperature. "Heating a material" is defined as raising the temperature of that material to a temperature above ambient temperature. "Melting a material" is defined herein as raising the temperature of the material to a temperature greater than the melting point of the material, or, for polymeric materials, raising the temperature above the glass transition temperature for the polymeric material. In alternate embodiments, the fiber producing device is not heated. Indeed, for any embodiment that employs a fiber producing device that may be heated, the fiber producing device may be used without heating. In some embodiments, the fiber producing device is heated but the material is not heated. The material becomes heated once placed in contact with the heated fiber producing device. In some embodiments, the material is heated and the fiber producing device is not heated. The fiber producing device becomes heated once it comes into contact with the heated material.

A wide range of volumes/amounts of material may be used to produce fibers. In addition, a wide range of rotation times may also be employed. For example, in certain embodiments, at least 5 milliliters (mL) of material are positioned in a fiber producing device, and the fiber producing device is rotated for at least about 10 seconds. As discussed above, the rotation may be at a rate of about 500 RPM to about 25,000 RPM, for example. The amount of material may range from mL to liters (L), or any range derivable therein. For example, in certain embodiments, at least about 50 mL to about 100 mL of the material are positioned in the fiber producing device, and the fiber producing device is rotated at a rate of about 500 RPM to about 25,000 RPM for about 300 seconds to about 2,000 seconds. In certain embodiments, at least about 5 mL to about 100 mL of the material are positioned in the fiber producing device, and the fiber producing device is rotated at a rate of 500 RPM to about 25,000 RPM for 10-500 seconds. In certain embodiments, at least 100 mL to about 1,000 mL of material is positioned in the fiber producing device, and the fiber producing device is rotated at a rate of 500 RPM to about 25,000 RPM for about 100 seconds to about 5,000 seconds. Other combinations of amounts of material, RPMs and seconds are contemplated as well.

Typical dimensions for fiber producing devices are in the range of several inches in diameter and in height. In some embodiments, a fiber producing device has a diameter of between about 1 inch to about 60 inches, from about 2 inches to about 30 inches, or from about 5 inches to about 25 inches. The height of the fiber producing device may range from about 1 inch to about 10 inches, from about 2 inches to about 8 inches, or from about 3 inches to about 5 inches.

In certain embodiments, fiber producing device includes at least one opening and the material is extruded through the opening to create the nanofibers. In certain embodiments, the fiber producing device includes multiple openings and the material is extruded through the multiple openings to create the nanofibers. These openings may be of a variety of shapes (e.g., circular, elliptical, rectangular, square) and of a variety of diameter sizes (e.g., 0.01-0.80 mm). When multiple openings are employed, not every opening need be identical to another opening, but in certain embodiments, every opening is of the same configuration. Some opens may include a divider that divides the material, as the material passes through the openings. The divided material may form multi-lumen fibers.

In an embodiment, material may be positioned in a reservoir of a fiber producing device. The reservoir may, for example, be defined by a concave cavity of the heated structure. In certain embodiments, the heated structure includes one or more openings in communication with the concave cavity. The fibers are extruded through the opening while the fiber producing device is rotated about a spin axis. The one or more openings have an opening axis that is not parallel with the spin axis. The fiber producing device may include a body that includes the concave cavity and a lid positioned above the body.

Another fiber producing device variable includes the material(s) used to make the fiber producing device. Fiber producing devices may be made of a variety of materials, including metals (e.g., brass, aluminum, stainless steel) and/or polymers. The choice of material depends on, for example, the temperature the material is to be heated to, or whether sterile conditions are desired.

Any method described herein may further comprise collecting at least some of the microfibers and/or nanofibers that are created. As used herein "collecting" of fibers refers to fibers coming to rest against a fiber collection device. After the fibers are collected, the fibers may be removed from a fiber collection device by a human or robot. A variety of methods and fiber (e.g., nanofiber) collection devices may be used to collect fibers.

Regarding the fibers that are collected, in certain embodiments, at least some of the fibers that are collected are continuous, discontinuous, mat, woven, nonwoven or a mixture of these configurations. In some embodiments, the fibers are not bundled into a cone shape after their creation. In some embodiments, the fibers are not bundled into a cone shape during their creation. In particular embodiments, fibers are not shaped into a particular configuration, such as a cone figuration, using gas, such as ambient air, that is blown onto the fibers as they are created and/or after they are created.

Present method may further comprise, for example, introducing a gas through an inlet in a housing, where the housing surrounds at least the heated structure. The gas may be, for example, nitrogen, helium, argon, or oxygen. A mixture of gases may be employed, in certain embodiments.

The environment in which the fibers are created may comprise a variety of conditions. For example, any fiber discussed herein may be created in a sterile environment. As used herein, the term "sterile environment" refers to an environment where greater than 99% of living germs and/or microorganisms have been removed. In certain embodiments, "sterile environment" refers to an environment substantially free of living germs and/or microorganisms. The fiber may be created, for example, in a vacuum. For example the pressure inside a fiber producing system may be less than ambient pressure. In some embodiments, the pressure inside a fiber producing system may range from about 1 millimeters (mm) of mercury (Hg) to about 700 mm Hg. In other embodiments, the pressure inside a fiber producing system may be at or about ambient pressure. In other embodiments, the pressure inside a fiber producing system may be greater than ambient pressure. For example the pressure inside a fiber producing system may range from about 800 mm Hg to about 4 atmospheres (atm) of pressure, or any range derivable therein.

In certain embodiments, the fiber is created in an environment of 0-100% humidity, or any range derivable therein. The temperature of the environment in which the fiber is created may vary widely. In certain embodiments, the temperature of the environment in which the fiber is created can be adjusted before operation (e.g., before rotating) using a heat source and/or a cooling source. Moreover, the temperature of the environment in which the fiber is created may be adjusted during operation using a heat source and/or a cooling source. The temperature of the environment may be set at sub-freezing temperatures, such as −20° C., or lower. The temperature of the environment may be as high as, for example, 2500° C.

The material employed may include one or more components. The material may be of a single phase (e.g., solid or liquid) or a mixture of phases (e.g., solid particles in a liquid). In some embodiments, the material includes a solid and the material is heated. The material may become a liquid upon heating. In another embodiment, the material may be mixed with a solvent. As used herein a "solvent" is a liquid that at least partially dissolves the material. Examples of solvents include, but are not limited to, water and organic solvents. Examples of organic solvents include, but are not limited to: hexanes, ether, ethyl acetate, acetone, dichloromethane, chloroform, toluene, xylenes, petroleum ether, dimethylsulfoxide, dimethylformamide, or mixtures thereof. Additives may also be present. Examples of additives include, but are not limited to: thinners, surfactants, plasticizers, or combinations thereof.

The material used to form the fibers may include at least one polymer. Polymers that may be used include conjugated polymers, biopolymers, water soluble polymers, and particle infused polymers. Examples of polymers that may be used include, but are not limited to polypropylenes, polyethylenes, polyolefins, polystyrenes, polyesters, fluorinated polymers (fluoropolymers), polyamides, polyaramids, acrylonitrile butadiene styrene, nylons, polycarbonates, beta-lactams, block copolymers or any combination thereof. The polymer may be a synthetic (man-made) polymer or a natural polymer. The material used to form the fibers may be a composite of different polymers or a composite of a medicinal agent combined with a polymeric carrier. Specific polymers that may be used include, but are not limited to chitosan, nylon, nylon-6, polybutylene terephthalate (PBT), polyacrylonitrile (PAN), poly(lactic acid) (PLA), poly(lactic-co-glycolic acid) (PLGA), polyglycolic acid (PGA), polyglactin, polycaprolactone (PCL), silk, collagen, poly (methyl methacrylate) (PMMA), polydioxanone, polyphenylene sulfide (PPS); polyethylene terephthalate (PET), polytetrafluoroethylene (PTFE), polyvinylidene fluoride (PVDF), polypropylene (PP), polyethylene oxide (PEO), acrylonitrile butadiene, styrene (ABS), and polyvinylpyrrolidone (PVP). These polymers may be processed as either a melt or as a solution in a suitable solvent.

In another embodiment, the material used to form the fibers may be a metal, ceramic, or carbon-based material. Metals employed in fiber creation include, but are not limited to, bismuth, tin, zinc, silver, gold, nickel, aluminum, or combinations thereof. The material used to form the fibers may be a ceramic such as alumina, titania, silica, zirconia, or combinations thereof. The material used to form the fibers may be a composite of different metals (e.g., an alloy such as nitonol), a metal/ceramic composite or ceramic oxides (e.g., PVP with germanium/palladium/platinum).

The fibers that are created may be, for example, one micron or longer in length. For example, created fibers may be of lengths that range from about 1 μm to about 50 cm, from about 100 μm to about 10 cm, or from about 1 mm to about 1 cm. In some embodiments, the fibers may have a narrow length distribution. For example, the length of the fibers may be between about 1 μm to about 9 μm, between about 1 mm to about 9 mm, or between about 1 cm to about 9 cm. In some embodiments, when continuous methods are performed, fibers of up to about 10 meters, up to about 5 meters, or up to about 1 meter in length may be formed.

In certain embodiments, the cross-section of the fiber may be circular, elliptical or rectangular. Other shapes are also possible. The fiber may be a single-lumen fiber or a multi-lumen fiber.

In another embodiment of a method of creating a fiber, the method includes: spinning material to create the fiber; where, as the fiber is being created, the fiber is not subjected to an externally-applied electric field or an externally-applied gas; and the fiber does not fall into a liquid after being created.

Fibers discussed herein are a class of materials that exhibit an aspect ratio of at least 100 or higher. The term "microfiber" refers to fibers that have a minimum diameter in the range of 10 microns to 700 nanometers, or from 5 microns to 800 nanometers, or from 1 micron to 700 nanometers. The term "nanofiber" refers to fibers that have a minimum diameter in the range of 500 nanometers to 1 nanometer; or from 250 nanometers to 10 nanometers, or from 100 nanometers to 20 nanometers.

While typical cross-sections of the fibers are circular or elliptic in nature, they can be formed in other shapes by controlling the shape and size of the openings in a fiber producing device (described below). Fibers may include a blending of multiple materials. Fibers may also include holes (e.g., lumen or multi-lumen) or pores. Multi-lumen fibers may be achieved by, for example, designing one or more exit openings to possess concentric openings. In certain embodiments, such openings may include split openings (that is, wherein two or more openings are adjacent to each other; or, stated another way, an opening possesses one or more dividers such that two or more smaller openings are made). Such features may be utilized to attain specific physical properties, such as thermal insulation or impact absorbance (resilience). Nanotubes may also be created using methods and apparatuses discussed herein.

Fibers may be analyzed via any means known to those of skill in the art. For example, Scanning Electron Microscopy (SEM) may be used to measure dimensions of a given fiber. For physical and material characterizations, techniques such as differential scanning calorimetry (DSC), thermal analysis (TA) and chromatography may be used.

In particular embodiments, a fiber of the present fibers is not a lyocell fiber. Lyocell fibers are described in the literature, such as in U.S. Pat. Nos. 6,221,487, 6,235,392, 6,511,930, 6,596,033 and 7,067,444, each of which is incorporated herein by reference.

In one embodiment, microfibers and nanofibers may be produced substantially simultaneously. Any fiber producing device described herein may be modified such that one or more openings has a diameter and/or shape that produces nanofibers during use, and one or more openings have a diameter and/or shape that produces microfibers during use. Thus, a fiber producing device, when rotated will eject material to produce both microfibers and nanofibers. In some embodiments, nozzles may be coupled to one or more of the openings. Different nozzles may be coupled to different openings such that the nozzles designed to create microfibers and nozzles designed to create nanofibers are coupled to the openings. In an alternate embodiment, needles may be coupled (either directly to the openings or via a needle port). Different needles may be coupled to different openings such that needles designed to create microfibers and needles designed to create nanofibers are coupled to the openings. Production of microfibers and nanofibers substantially simultaneously may allow a controlled distribution of the fiber size to be achieved, allowing substantial control of the properties of products ultimately produced from the microfiber/nanofiber mixture.

After production of fibers is completed, it is desirable to clean the fiber producing device to allow reuse of the system. Generally, it is easiest to clean a fiber producing device when the material is in a liquid state. Once the material reverts to a solid, cleaning may be difficult, especially cleaning up small diameter nozzles and or needles coupled to the fiber producing device. The difficulty, especially with melt spinning, is that cleanup may also be difficult when the device is at an elevated temperature, especially if the fiber producing device needs to be cooled prior to handling for clean up. In some embodiments, a purge system may be couplable to fiber producing device when the fiber producing device is heated. A purge system may provide an at least partial seal between the purge system and the body of a fiber producing device such that a gas may be directed into the body, through the purge system, to create a pressurized gas inside of the body. The purge system, in some embodiments, includes a sealing member couplable to the body, a pressurized gas source, and a conduit coupling the pressurized gas source to the sealing member.

Microfibers and nanofibers produced using any of the devices and methods described herein may be used in a variety of applications. Some general fields of use include, but are not limited to: food, materials, electrical, defense, tissue engineering, biotechnology, medical devices, energy, alternative energy (e.g., solar, wind, nuclear, and hydroelectric energy); therapeutic medicine, drug delivery (e.g., drug solubility improvement, drug encapsulation, etc.); textiles/fabrics, nonwoven materials, filtration (e.g., air, water, fuel, semiconductor, biomedical, etc); automotive; sports; aeronautics; space; energy transmission; papers; substrates; hygiene; cosmetics; construction; apparel, packaging, geotextiles, thermal and acoustic insulation.

Some products that may be formed using microfibers and/or nanofibers include but are not limited to: filters using charged nanofiber and/or microfiber polymers to clean fluids; catalytic filters using ceramic nanofibers ("NF"); carbon nanotube ("CNT") infused nanofibers for energy storage; CNT infused/coated NF for electromagnetic shielding; mixed micro and NF for filters and other applications; polyester infused into cotton for denim and other textiles; metallic nanoparticles or other antimicrobial materials infused onto/coated on NF for filters; wound dressings, cell growth substrates or scaffolds; battery separators; charged polymers or other materials for solar energy; NF for use in environmental clean-up; piezoelectric fibers; sutures; chemical sensors; textiles/fabrics that are water & stain resistant, odor resistant, insulating, self-cleaning, penetration resistant, anti-microbial, porous/breathing, tear resistant, and wear resistant; force energy absorbing for personal body protection armor; construction reinforcement materials (e.g., concrete and plastics); carbon fibers; fibers used to toughen outer skins for aerospace applications; tissue engineering substrates utilizing aligned or random fibers; tissue engineering Petri dishes with aligned or random nanofibers; filters used in pharmaceutical manufacturing; filters combining microfiber and nanofiber elements for deep filter functionality; hydrophobic materials such as textiles; selectively absorbent materials such as oil booms; continuous length nanofibers (aspect ratio of more than 1,000 to 1); paints/stains; building products that enhance durability, fire resistance, color retention, porosity, flexibility, anti microbial, bug resistant, air tightness; adhesives; tapes; epoxies; glues; adsorptive materials; diaper media; mattress covers; acoustic materials; and liquid, gas, chemical, or air filters.

Fibers may be coated after formation. In one embodiment, microfibers and/or nanofibers may be coated with a polymeric or metal coating. Polymeric coatings may be formed by spray coating the produced fibers, or any other method known for forming polymeric coatings. Metal coatings may be formed using a metal deposition process (e.g., CVD).

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A device for use in a microfiber and/or nanofiber producing system, the device comprising:
    a body;
    an internal cavity disposed in the body;
    one or more openings that allow material to be passed from the internal cavity to the exterior of the body;
    a coupling member, wherein the fiber producing device is couplable to a driver through the coupling member; and
    a draft member being a fan blade coupled to the body, wherein rotation of the fan blade creates a gas flow axially or radially away from the coupling member of the fiber producing device,
    wherein the body is configured to receive a material to be produced into a fiber, and
    wherein, during use, rotation of the body causes material in the internal cavity to be passed through one or more openings to produce microfibers and/or nanofibers, and wherein the gas flow produced by the draft member conveys at least some of the produced microfibers and/or nanofibers away from the body during use.

2. The device of claim 1, wherein the draft member comprises:
    an interior cavity,
    a first end coupled to the body; and
    an opening positioned at a second end of the draft member, opposite to the first end,
    wherein material in the body passes into the internal cavity through the first end and through one or more of the openings to produce the microfibers and/or nanofibers.

3. The device of claim 1, wherein at least a portion of the draft member is angled with respect to a plane perpendicular to the axis of rotation, the angle being such that the gas flow moves axially or radially away from the coupling member due to rotation of the draft member.

4. The device of claim 1, wherein the body comprises a ring-shaped substrate defining the internal cavity, and wherein the draft member couples the ring shaped substrate to the coupling member.

5. The device of claim 4, wherein the ring-shaped substrate comprises a circular channel coupled to the internal cavity, wherein during use, the material is introduced into the circular channel and conveyed through the circular channel into the internal cavity.

6. The device of claim 1, wherein the body comprises a ring-shaped substrate defining the internal cavity, and wherein the draft member extends away from the ring shaped substrate, and wherein the openings are formed at an end of the draft member.

7. The device of claim 6, wherein the ring-shaped substrate comprises a circular channel coupled to the internal cavity, wherein during use, the material is introduced into the circular channel and conveyed through the circular channel into the internal cavity.

8. The device of claim 6, wherein the draft member comprises one or more raised members that are aligned with the axis rotation, and wherein, during rotation of the fiber producing device, the raised members create a gas flow in a direction both perpendicular to the axis of rotation and parallel to the axis of rotation.

9. The device of claim 1, wherein the body comprises a ring-shaped substrate defining the internal cavity and one or more coupling rods coupling the ring-shaped substrate to the coupling member, and wherein the draft member extends away from the ring shaped substrate, and wherein the openings are formed at an end of the draft member.

10. The device of claim 1, wherein the plurality of openings are in a pattern, and wherein the pattern of openings are positioned such that entwining of the produced microfibers and/or nanofibers is inhibited.

11. A system for producing microfibers and/or nanofibers comprising:
    a fiber producing device comprising:
        a body; an internal cavity disposed in the body;
        one or more openings that allow material to be passed from the internal cavity to the exterior of the body;
        a coupling member, wherein the fiber producing device is couplable to a driver through the coupling member; and
        a draft member being a fan blade coupled to the body, wherein rotation of the fan blade creates a gas flow axially or radially away from the coupling member of the fiber producing device,
        wherein the body is configured to receive a material to be produced into a fiber,
    a driver capable of rotating the body, wherein the body is couplable to the driver through the coupling member;
    wherein, during use, rotation of the body causes material in the body to be passed through one or more openings to produce microfibers and/or nanofibers.

12. A device for use in a microfiber and/or nanofiber producing system, the device comprising:
    a body;
    an internal cavity disposed in the body;
    one or more openings that allow material to be passed from the internal cavity to the exterior of the body;
    a coupling member, wherein the fiber producing device is couplable to a driver through the coupling member; and
    a means for producing a gas flow coupled to the body, wherein rotation of the means for producing a gas flow creates a gas flow axially or radially away from the coupling member of the fiber producing device;

wherein the body is configured to receive a material to be produced into a fiber, and wherein, during use, rotation of the body causes material in the internal cavity to be passed through one or more openings to produce microfibers and/or nanofibers, and wherein the gas flow produced by the draft member conveys at least some of the produced microfibers and/or nanofibers away from the body during use.

13. The device of claim 1, wherein the rotation of the fan blade creates at least an axial gas flow.

14. The device of claim 1, wherein the fan blade is coupled to the body such that the fan blade rotates with the body.

15. The device of claim 11, wherein the fan blade is coupled to the body such that the fan blade rotates with the body.

16. The device of claim 12, wherein the means for producing a gas flow is coupled to the body such that the means for producing a gas flow rotates with the body.

17. The device of claim 12, wherein the means for producing the gas flow axially or radially away from the coupling member is a draft member.

* * * * *